US012606421B2

(12) United States Patent
Bergeron et al.

(10) Patent No.: US 12,606,421 B2
(45) Date of Patent: Apr. 21, 2026

(54) LEVEL CUT CLAMSHELL BUCKET ASSEMBLY

(71) Applicant: CABLE ARM INC., Trenton, MI (US)

(72) Inventors: Raymond E. Bergeron, Trenton, MI (US); Joseph M. Tedder, Jr., Allen Park, MI (US)

(73) Assignee: CABLE ARM INC., Trenton, MI (US)

( * ) Notice: Subject to any disclaimer, the term of this patent is extended or adjusted under 35 U.S.C. 154(b) by 391 days.

(21) Appl. No.: 18/203,246

(22) Filed: May 30, 2023

(65) Prior Publication Data

US 2023/0399204 A1 Dec. 14, 2023

Related U.S. Application Data

(60) Provisional application No. 63/350,453, filed on Jun. 9, 2022.

(51) Int. Cl.
*B66C 3/02* (2006.01)
*B66C 3/06* (2006.01)

(52) U.S. Cl.
CPC . *B66C 3/02* (2013.01); *B66C 3/06* (2013.01)

(58) Field of Classification Search
CPC .................................... B66C 3/02; B66C 3/06
See application file for complete search history.

(56) References Cited

U.S. PATENT DOCUMENTS 5,125,628 A 6/1992 Rempinski et al.
5,501,024 A * 3/1996 Bergeron .................. B66C 3/12 294/68.23
5,553,404 A * 9/1996 Bergeron .................. B66C 3/12 37/340
5,561,922 A 10/1996 Lynch
5,649,635 A 7/1997 Casavant et al.
(Continued)

FOREIGN PATENT DOCUMENTS

CN 209457062 U 10/2019
JP 201344208 A 3/2013
JP 6260904 B2 1/2018

OTHER PUBLICATIONS

Canadian Office Action for Appln. No. 3,202,413, mailed Jan. 3, 2025, 7 pages.

*Primary Examiner* — Matthew R Buck
(74) *Attorney, Agent, or Firm* — Dinsmore & Shohl LLP

(57) ABSTRACT

A clamshell bucket assembly including first and second pivotally connected steel bucket halves rotating between open and closed positions and including sediment retention bars secured between the overlapping sides define a scoop for permitting outflow of water while retaining a volume of a dredged material. Weld rivets provide reinforced securing of the side and bottom steel portions of each bucket half and extend a thickness of the bucket halves to prevent fracturing at the welded interface. Upper and lower sheave assemblies provide increased durability and wear resistance during repetitive opening and closing of the mechanical bucket halves. The sheaves each include a central pin supporting hub collar formed from a plurality of progressively inwardly stepped and stacked disc shaped plates, these being initially sectioned from a hardened steel sheet and welded to form the hub at the highest zone or area of stress exerted upon the sheave during operation of the bucket.

17 Claims, 22 Drawing Sheets

(56) References Cited

U.S. PATENT DOCUMENTS

| | | | | |
|---|---|---|---|---|
| 5,984,394 | A | 11/1999 | Bergeron | |
| 6,432,303 | B1 | 8/2002 | Chesner et al. | |
| 6,712,979 | B2 | 3/2004 | Chesner et al. | |
| 7,350,322 | B2 | 4/2008 | Langdon | |
| 7,509,759 | B2 | 3/2009 | Langdon et al. | |
| 9,452,912 | B1 * | 9/2016 | Bergeron | E02F 3/4135 |
| 10,308,484 | B2 | 6/2019 | Bergeron | |
| 10,822,202 | B2 | 11/2020 | Lee et al. | |
| 11,059,699 | B2 | 7/2021 | Duvall et al. | |
| 11,261,062 | B2 | 3/2022 | Torlai et al. | |
| 11,279,601 | B2 | 3/2022 | Kaybidge | |
| 2002/0185424 | A1 | 12/2002 | Chesner et al. | |
| 2004/0026676 | A1 | 2/2004 | Smith et al. | |
| 2005/0241192 | A1 | 11/2005 | Langdon | |
| 2008/0282836 | A1 | 11/2008 | Hosenfeldt et al. | |
| 2017/0138015 | A1 | 5/2017 | Jamilosa | |
| 2021/0131058 | A1 * | 5/2021 | Bergeron | B66C 3/005 |

* cited by examiner

| PART LIST | | | |
|---|---|---|---|
| ITEM | QTY | PART NUMBER | DESCRIPTION |
| 242 | 1 | HUB PIN | |
| 230, 232 | 2 | HUB COVER PLATE | |
| 236 | 1 | SHEAVE HUB MOUNTING BLOCK | |
| 238 | 4 | COVER PLATE INDEXING HORSESHOE | |
| 226, 228 | 2 | UHMW RING | |
| 231, 233 | 2 | HUB COVER PLATE COLLAR | |
| 222, 224 | 2 | SEALING RING | |
| 214, 216 | 2 | BRONZE BUSHING | |
| 206 | 2 | HUB PLATE 1 | |
| 208 | 2 | HUB PLATE 2 | |
| 210 | 1 | HUB PLATE CENTER | |
| 234 | 1 | SHEAVE HUB MOUNTING BLOCK OPPOSITE END | |
| 218, 220 | 2 | SHEAVE HUB BACKER PLATE | |
| 202 | 1 | 30 INCH UPPER SHEAVE REV 3 | |
| 235 | 4 | 30 INCH SHEAVE INDEXING PLATE BACK PLATE | |
| 212 | 1 | GREASE STEM | |

FIG. 9

| PART LIST | | | |
|---|---|---|---|
| ITEM | QTY | PART NUMBER | DESCRIPTION |
| 302 | 1 | 48 INCH LOWER SHEAVE | |
| 311, 314 | 2 | CENTER PLASTIC RING FOR LOWER SHEAVE | |
| 316, 318, 320, 322 | 4 | PLASTIC RING FOR LOWER SHEAVE | |
| 306 | 1 | INNER HUB PLATE | |
| 308, 309 | 2 | OUTER HUB PLATE | |
| 325 | 2 | 48 INCH HUB COVER PLATE COLLAR | |
| 324 | 2 | 48 INCH SHEAVE HUB COVER PLATE | |
| 332 | 2 | OUTER PIN PLATE | |
| 324 | 1 | INNER PIN PLATE | |
| 328 | 4 | ANTI-ROTATION STUDS | |
| 330 | 4 | ANTI-ROTATION TAB END PLATE | |

FIG. 12

FIG. 18
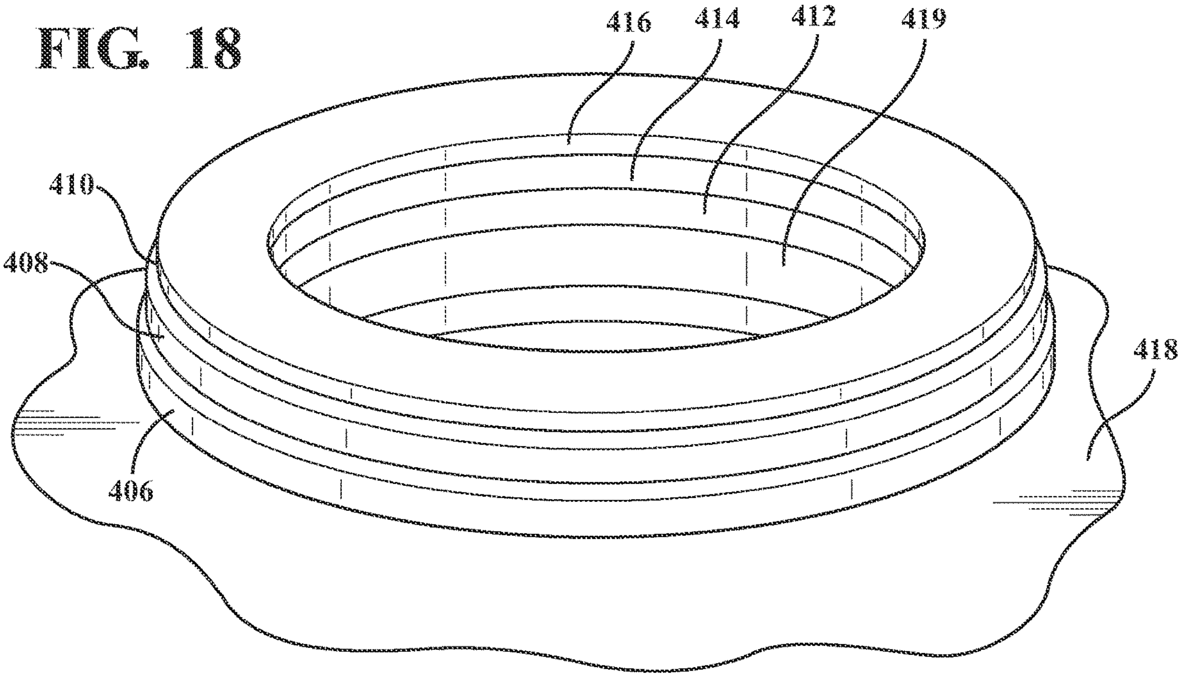
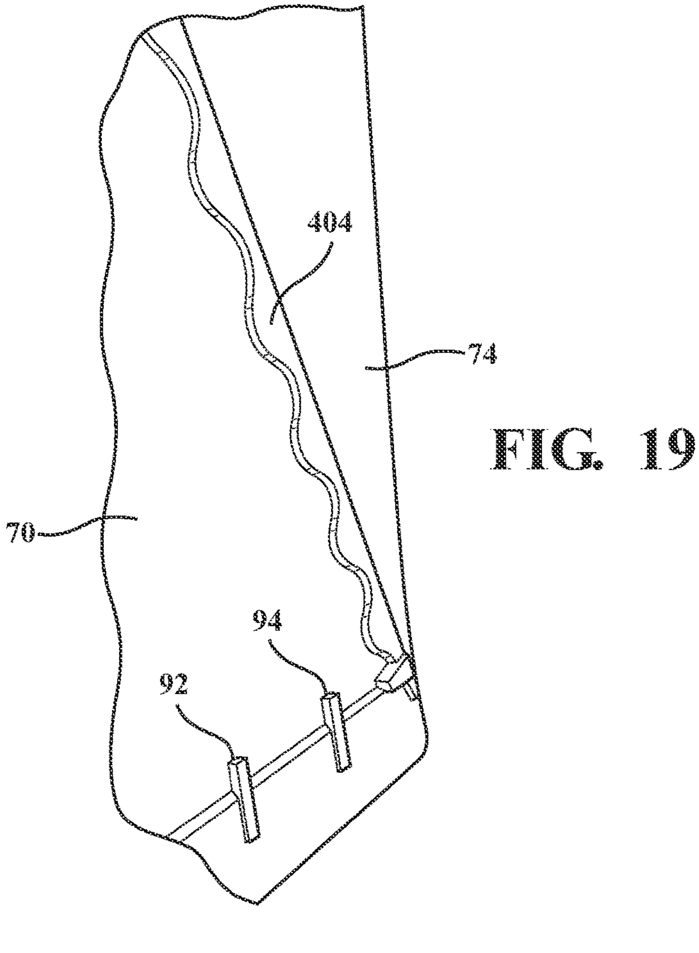
FIG. 19

LEVEL CUT CLAMSHELL BUCKET ASSEMBLY

CROSS REFERENCE TO RELATED APPLICATIONS

The present application claims the priority of U.S. Ser. No. 63/350,453 filed Jun. 9, 2022.

FIELD OF THE INVENTION

The present invention relates generally to clamshell bucket assemblies. More specifically, the present invention teaches a novel clamshell bucket assembly incorporating improved construction for both resiliency and to prevent sediment leakage during any type of dredging operation, including environmental dredging in order to remove potentially toxic material.

BACKGROUND OF THE INVENTION

The prior art is documented with numerous clamshell bucket assemblies. These include in a first instance hydraulic powered buckets (see for example U.S. Pat. Nos. 9,452,912 and 10,308,484, both to Bergeron) in which one or more pairs of cylinders actuate first and second clamshell style bucket halves between opened and closed positions, In a second instance, mechanically operable bucket assemblies (examples of which are shown in U.S. Pat. Nos. 5,984,394 and 5,553,404 also to Bergeron) operate on the principal of having outer suspension lines or cables which, in combination with upper and lower pulley supporting sheave assemblies, facilitate the opening and closing of the clamshell bucket halves.

SUMMARY OF THE INVENTION

The present invention discloses an improved bucket design for use, such as with a level cut clamshell bucket assembly having first and second pivotally associated and mechanically openable/closable clamshell bucket halves. In particular, the present invention, teaches an improved level cut bucket design utilizing each of sediment retaining bars secured along overlapping opposing side edges of the pivotally associated clamshell bucket halves defining first and second ends in the closed position.

Additional features include spaced apart and elongated bar shaped weld rivets for reinforced securing of the side and bottom steel portions of each bucket half. The bar shaped weld rivets extend the full thickness of the steel and prevent fracturing at the welded interface, such as in response to impacts (e.g. boulders or the like) resulting from closing of the dredging bucket.

The present invention also includes improved upper and lower sheave assemblies, which provide increased durability and wear resistance during repetitive opening and closing of the mechanical bucket halves. This includes constructing the pivotally central pin supporting hub collar from a plurality of progressively inwardly stepped and stacked disc shaped plates, these being initially sectioned from a typically once inch sheet of hardened steel and welded to form the support collar hub located at a highest zone or area of stress exerted upon the sheave assembly.

BRIEF DESCRIPTION OF THE DRAWINGS

Reference will now be made to the attached drawings, when read in combination with the following detailed description, wherein like reference numerals refer to like parts throughout the several views, and in which:

FIG. 9 is a parts list of the upper sheave assembly in FIG. 8;

FIG. 12 is a parts list of the lower sheave assembly in FIG. 11;

FIG. 18 is a sectional view of central pin supporting hub collar formed from a plurality of progressively inwardly stepped and stacked disc shaped plates, these being initially sectioned from a typically once inch sheet of hardened steel and welded to form the support collar hub at the highest zone or area of stress exerted upon either of the upper or lower sheave subassemblies;

FIG. 19 is an illustration of an alternate configuration of side weld bars located along the overlapping bucket edges to prevent seepage of the dredged sediment according to the embodiment of FIG. 16;

DETAILED DESCRIPTION OF THE PREFERRED EMBODIMENTS

With reference to the attached illustrations, the present invention discloses a novel clamshell bucket assembly incorporating improved construction for providing both durability and resiliency and to prevent sediment leakage during any type of dredging operation, including environmental dredging in order to remove potentially toxic material. Without limitation, the features associated with the present invention are equally applicable to both level cut environmental dredging buckets (i.e., those designed to remove a minimal thickness layer of environmentally contaminated sediment associated with each operational cycle or cut), as well as being incorporated into standard dredging buckets designed to remove larger volumes of sediment, such as in order to deepen channels and other waterway passages.

Figure 1:
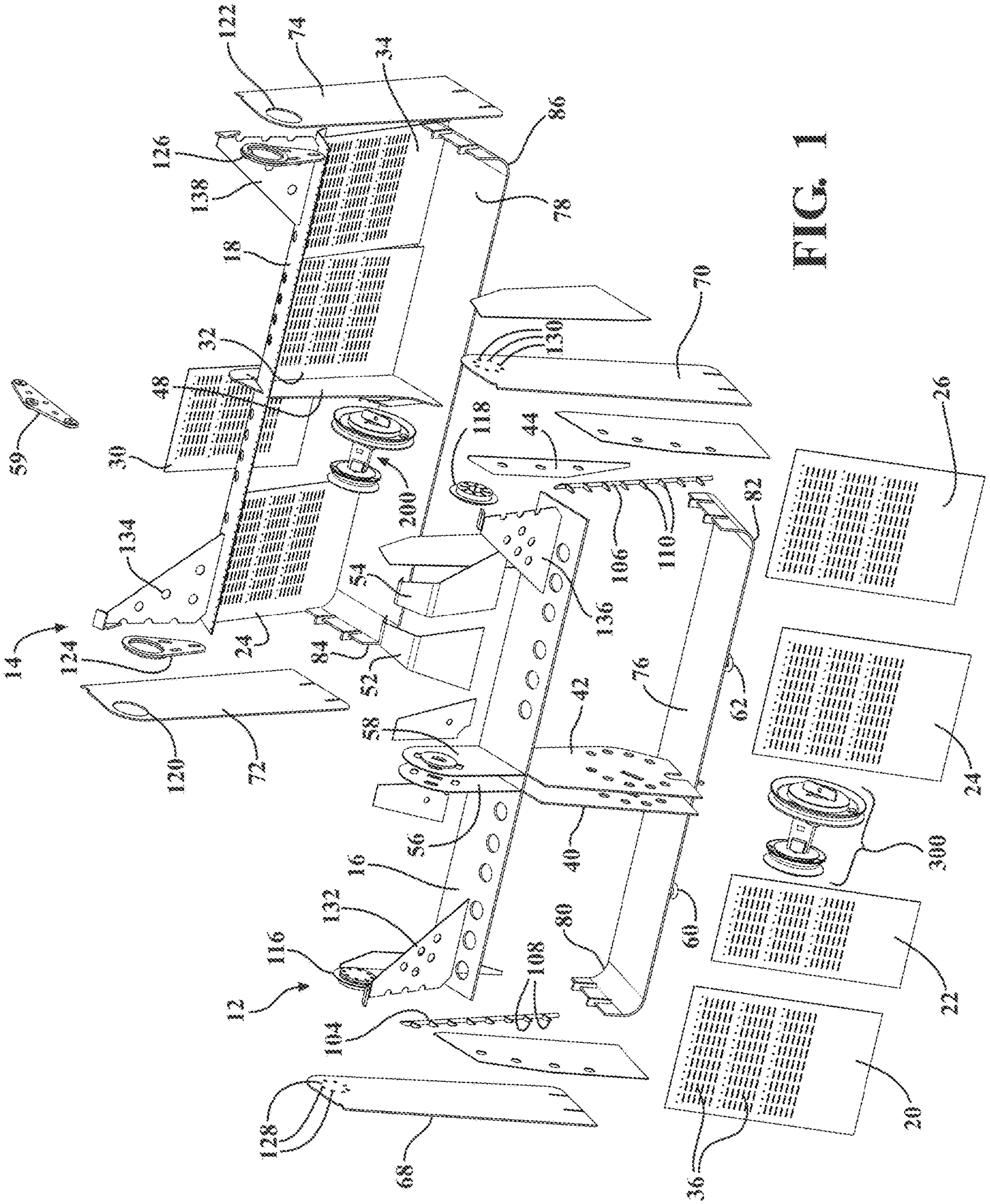
FIG. 1 is an exploded perspective of the improved level cut clamshell bucket of the present invention.

As will be further described, features associated with the clamshell bucket design include each of sediment retaining side bars incorporated along overlapping opposing edges of the clamshell bucket halves in the closed position. Other features again include spaced apart weld rivets for reinforced securing of the side and bottom steel portions of each bucket half, as well as the provision of reinforced upper and lower sheave assemblies, such including strengthened hub collars, which provide increased durability and wear resistance during repetitive opening and closing of the bucket halves Referencing initially, FIG. 1 provides an exploded perspective of the improved level cut clamshell bucket, see also generally at 10 in the iso-assembled view of FIG. 2, of the present invention. The bucket 10 includes first 12 and second 14 bucket halves, each of which are weld assembled from a number of individual steel sub-components as will be described. Each of the bucket halves 12 and 14 form a multi-sided scoop such that, and upon being first lowered and then pivoted together to a closed position (see also FIGS. 2-3), the bucket halves collectively define an enclosed chamber in which a volume of a dredged sediment is retained, while water initially trapped within the scoop is allowed to drain out upon lifting of the bucket above a water level associated with an undersea dredging operation. As further shown, each bucket half 12/14 includes a frame, depicted at 16 and 18 respectively.

A plurality of individual panels (see at 20, 22, 24 and 26 for first frame 16 and further at 28, 30, 32 and 34 for second frame 18) are provided and which, upon being welded to each of the frames 16/18, define an extending side wall of each frame. The panels each further include a solid lower portion and an aperture locations distributed across an upper portion (see apertures at 36 for selected panel 20 in FIG. 1), this in order to permit dewatering outflow during raising of the bucket above the water level, this combined with sediment retention within the lower volume of each clamshell bucket. Pluralities of reinforcement brackets are provided in alternating fashion between each of the side panels and are additionally shown in the open pivoted view of FIG. 4 at each of 38, 40, 42 and 44 for bucket half 12, and further at 46, 48 and 50 for bucket half 14.

Figure 10:
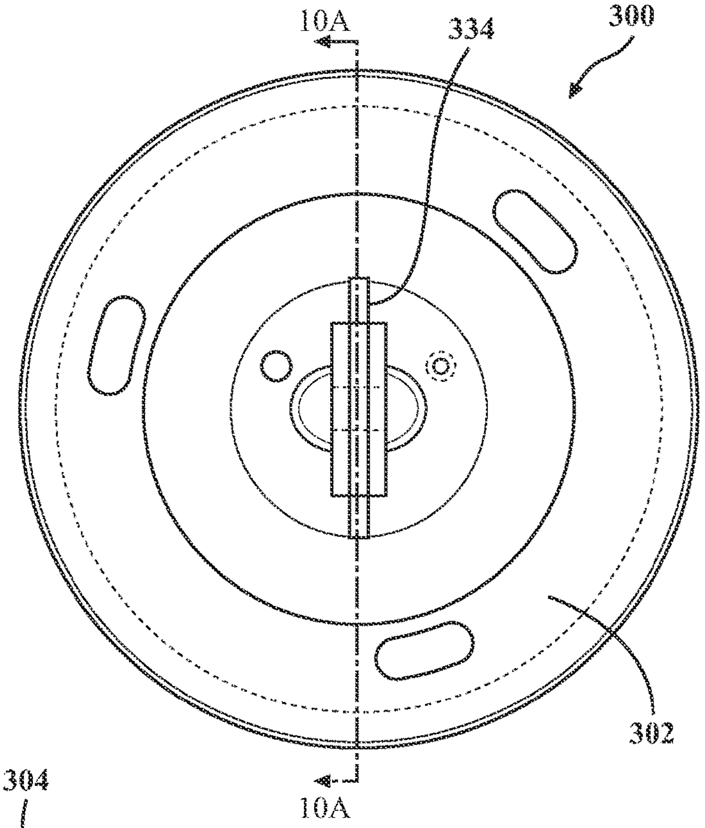
FIG. 10 presents a plan view of the lower sheave assembly.
Figure 11:
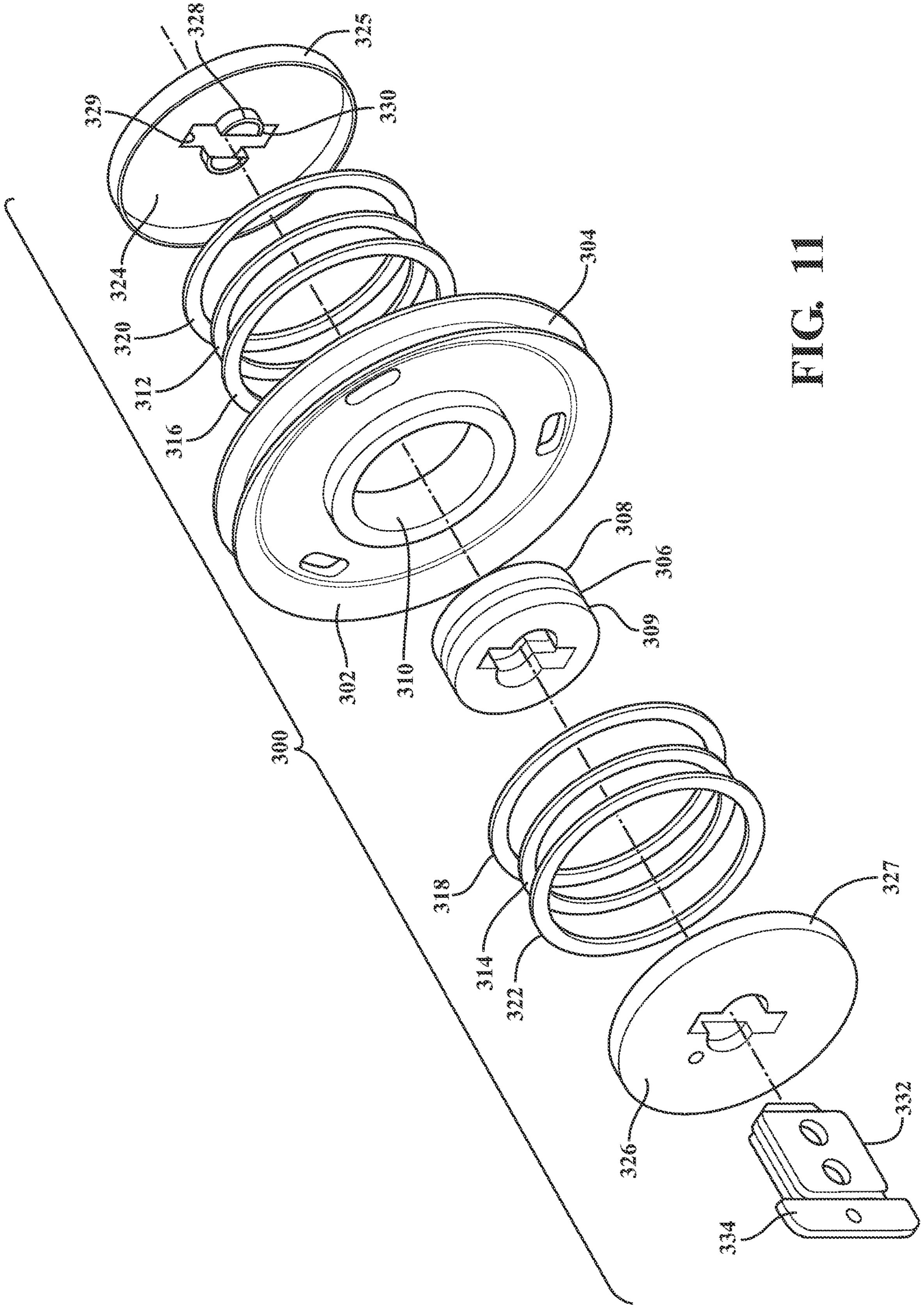
FIG. 11 is an exploded view of the lower sheave assembly.

The present invention further includes each of an upper sheave assembly 200 and a lower sheave assembly 300 (see again as best shown in the assembled view of FIG. 2), with the lower sheave assembly supported between the brackets 40/42 incorporated into the first bucket half 12 (and further described in reference to FIGS. 10-12). A pair of flange supports are depicted at 52 and 54 and which, in combination with inner supporting plates 56 and 58, projecting from a top surface of the frame 16 of the first bucket half frame 12 in order to support the upper sheave assembly 200 (further described in reference to FIGS. 7-9).

Figure 4:
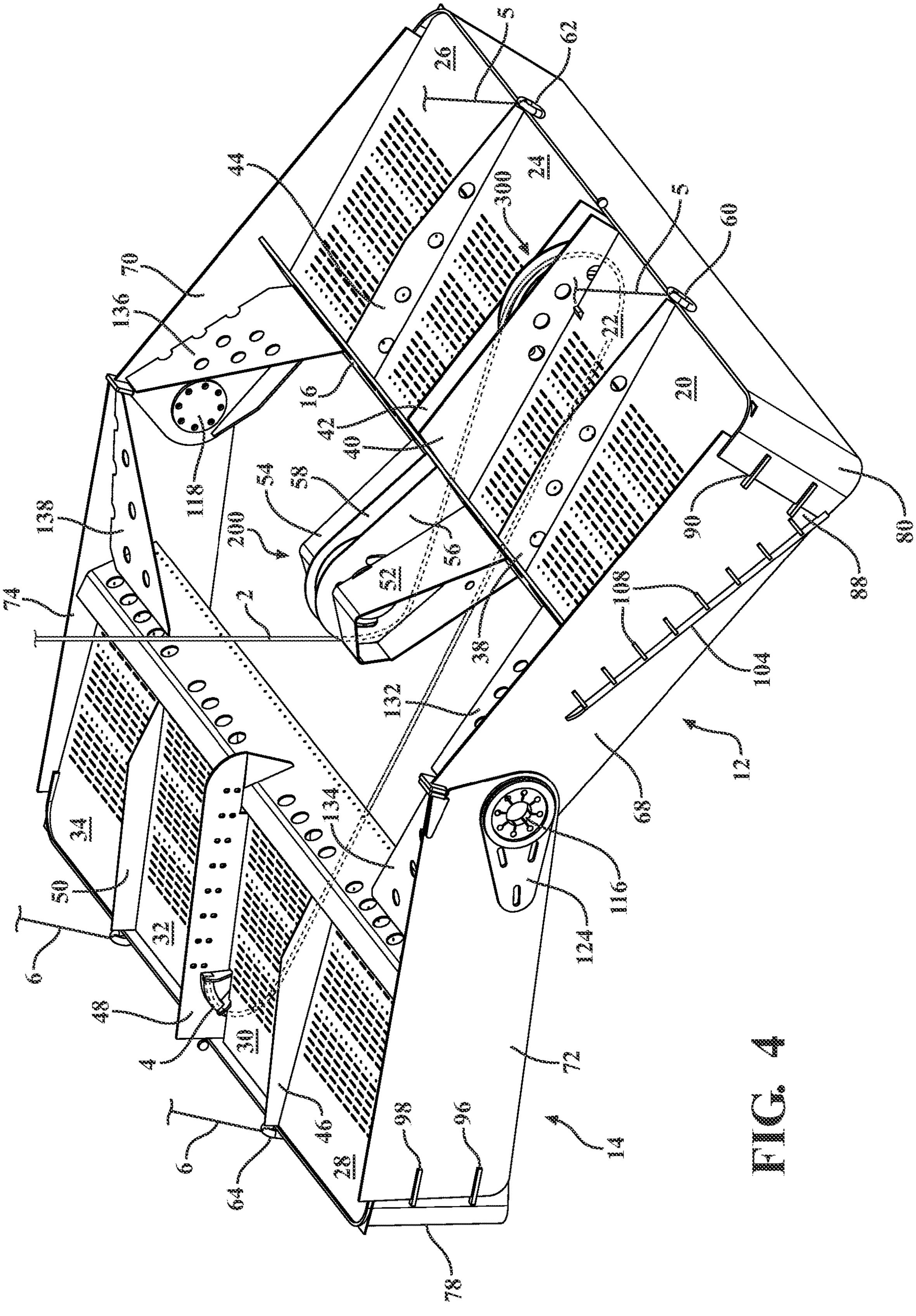
FIG. 4 is an illustration of the bucket in FIG. 2 in an open pivoted configuration.
Figure 16:
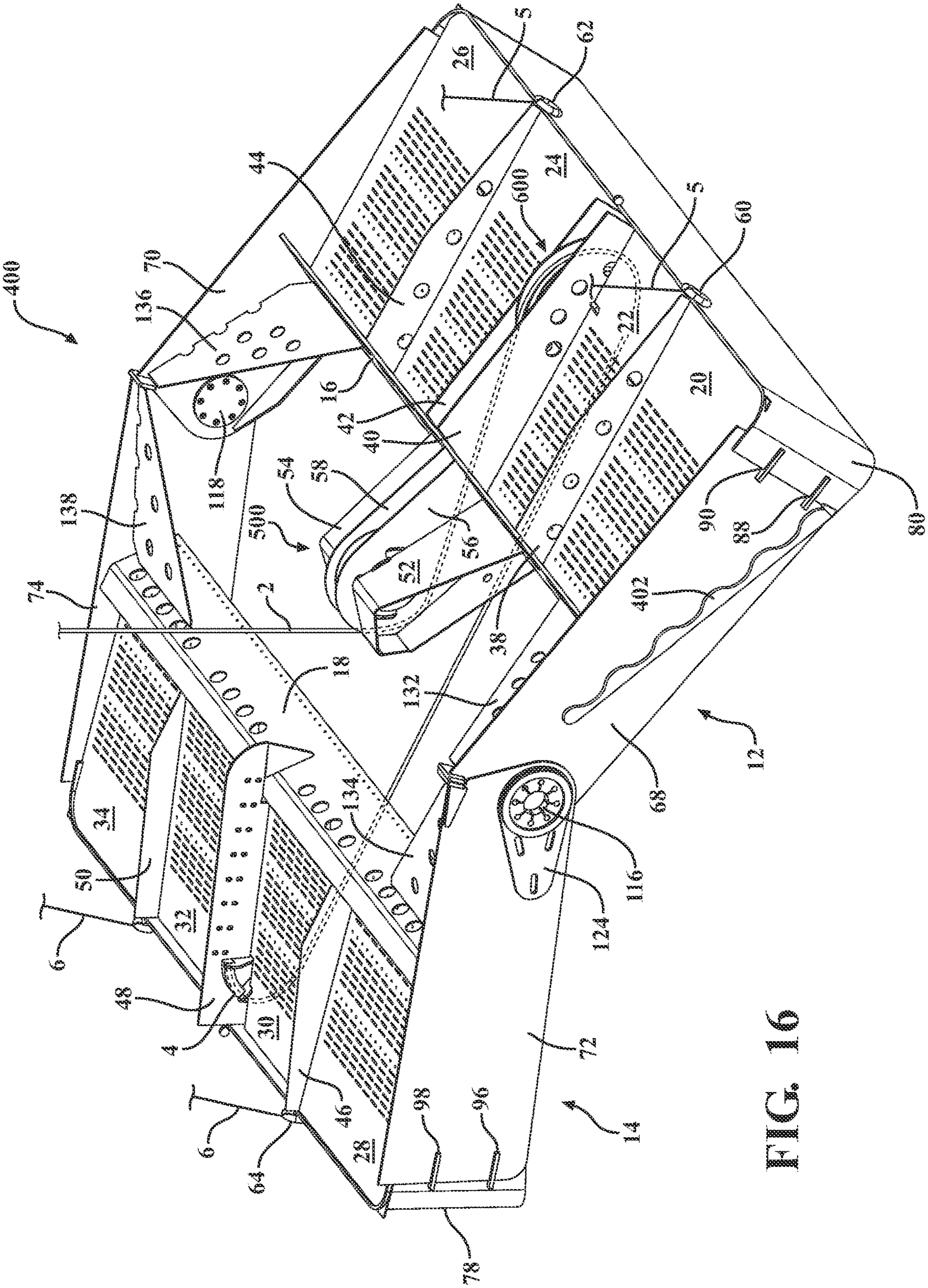
FIG. 16 is an illustration similar to FIG. 4 of an improved level cut clamshell bucket according to a further embodiment of the present invention.

As will be further described, the upper 200 and lower sheaves 300 define pulley supports for receiving a displaceable line (reference being made to line 2 depicted in each of FIG. 4 and subsequent embodiment of FIG. 16). The line 2 (typically a heavy duty multi strand steel cable) is associated with a supporting crane or like construction equipment (not shown) and extends successively through an upper positioned bridle or guide component 59 (again FIG. 1) to each of the upper sheave 200, lower sheave 300 and before terminating at a fixed end point configured with the other bucket half 14 (see as further shown at 4 in FIGS. 4 and 16). In combination, additional suspension lines (see as depicted by pairs of cables 5 and 6 shown in reduced length in each of FIGS. 4 and 16) extend to each of multiple outer edge locations associated with each of the bucket halves (this further depicted as bottom attached shackles at 60 and 62 for bucket half 12 and further at 64 and 66 for bucket half 14), and which operate in combination to mechanically open and close the pivotally assembled bucket halves 12/14.

In operation, the pairs 5 and 6 of the fixed lines or cables extend upwardly and converge at an elevated location, typically the bridle component 59 located above the bucket, this in order to maintain the halves in a normally open position. In order to close the bucket halves, the sheave supported line or cable 2 is retracted upwardly within the boom of the overhead supporting power equipment (not shown) in order to both draw together and concurrently incrementally elevate the bucket halves 12/14 upon counteracting the fixed pairs of cables 5 and 6 (such occurring at the submerged or undersea sediment location).

Following this, the bucket is elevated above the water level surface and, once repositioned at the desired release location, the bucket halves are reopened by reverse downward translation of the cables to allow the suspending pairs of cables 5/6 to return the bucket to the open position. Without limitation, it is envisioned and understood that a similar hydraulic bucket design could be employed with the other features of the present invention (sediment retention bars and reinforcing weld ribs) this in substitution of the upper and lower sheaves.

The individual bucket half designs each further include opposite end welded side plates (see at 68 and 70 for first bucket half 12 and further at 72 and 74 for second bucket half 14). Bottom plates 76 and 78 are also provided for the bucket halves 12/14, each extending in length similar to the width extending upper frames 16/18 for supporting the pluralities of attached panels 20, 22, 24 and 26, as well as again at 28, 30, 32 and 34 between the opposite ends of the bucket halves corresponding to the arrangement of the side plates 68/70 and 72/74. The bottom plates 76/78 each include a curved end (see at 80/82 for bottom plate 76 and further at 84/86 for bottom plate 78) to which the which the pairs of side plates 68/70 and 72/74 are weld attached along their overlapping lengths.

Additional reinforcement to the bottom to side plate welded attachment locations is provided by individual pluralities of elongated bar shaped weld rivets, and such as which can include two or more rivets provided at each edge connection. Referencing FIGS. 2-3 in combination, these are shown by pairs of weld rivets 88/90 and 92/94 at opposite ends 80/82 of bottom plate 76 of first bucket half 12, and further by weld rivets 96/98 and 100/102 at opposite ends 84/86 of bottom plate 78 of second bucket half 14.

Also shown are a pair of sediment retaining side bars, see at 104 and 106 which are secured to outer facing side edge locations of the inner spaced side plates 68/70 of the first bucket half 12, such that the retention bars 104/106 abut opposing outer overlapping edges of the side plates 72/74 of the second bucket half 14 in order to prevent outflow of sediment contained in the bottom scoop of the closed bucket. Pluralities of support ribs are provided for securing the sediment retention bars and are depicted at 108 for bar 104 and at 110 for bar 106. The support ribs extend from the bars in a generally crosswise direction away from the overlapping contact with the second bucket half 14 and are welded directly to the side plates 68 and 70.

Figure 2:
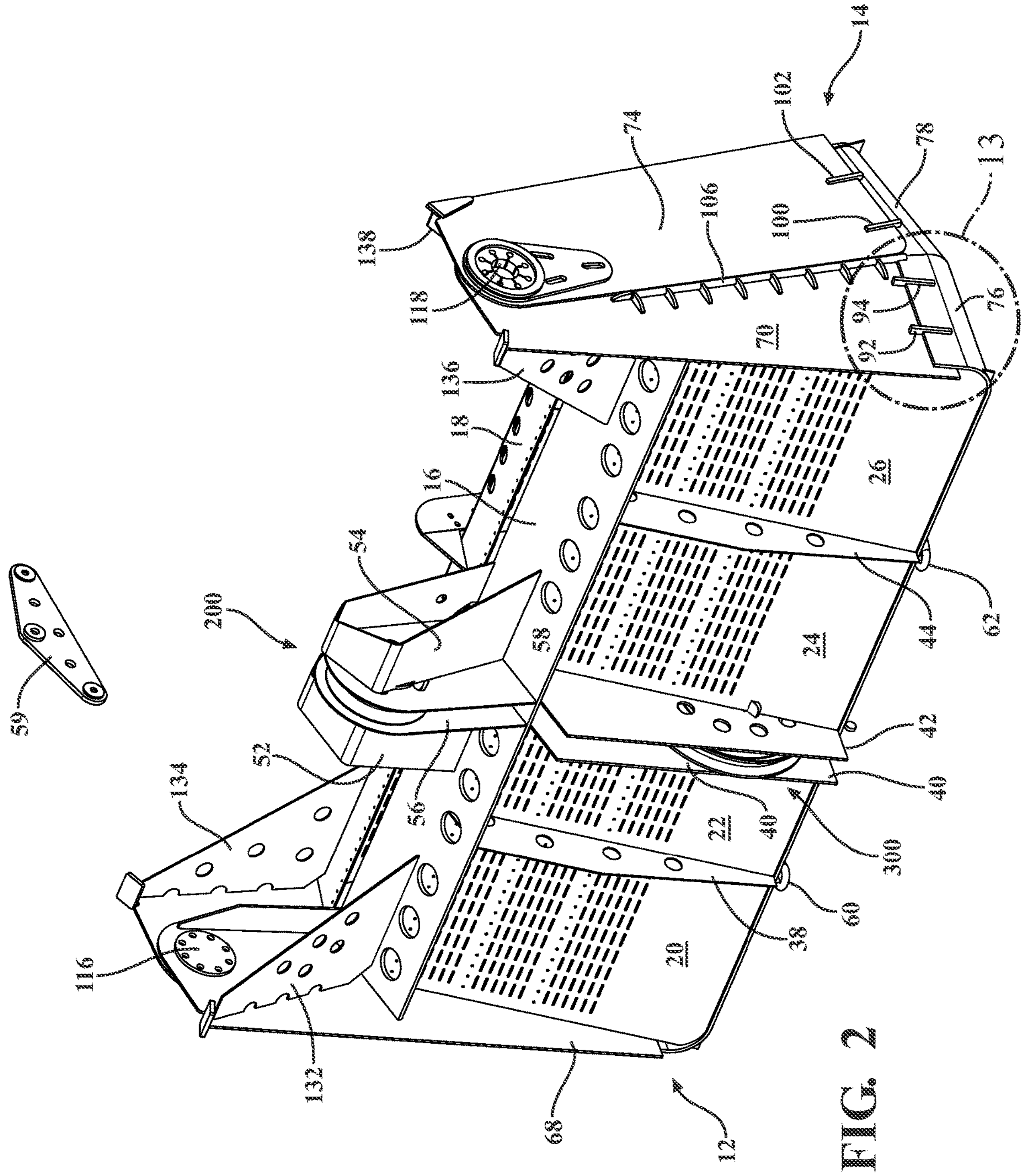
FIG. 2 is a succeeding assembled perspective of FIG. 1 and illustrating the features of the side weld bars located along the overlapping bucket edges to prevent seepage of the dredged sediment, combined with the welded bar shaped rivets extending the thickness between the side and end connected steel portions of each bucket half.
Figure 13:
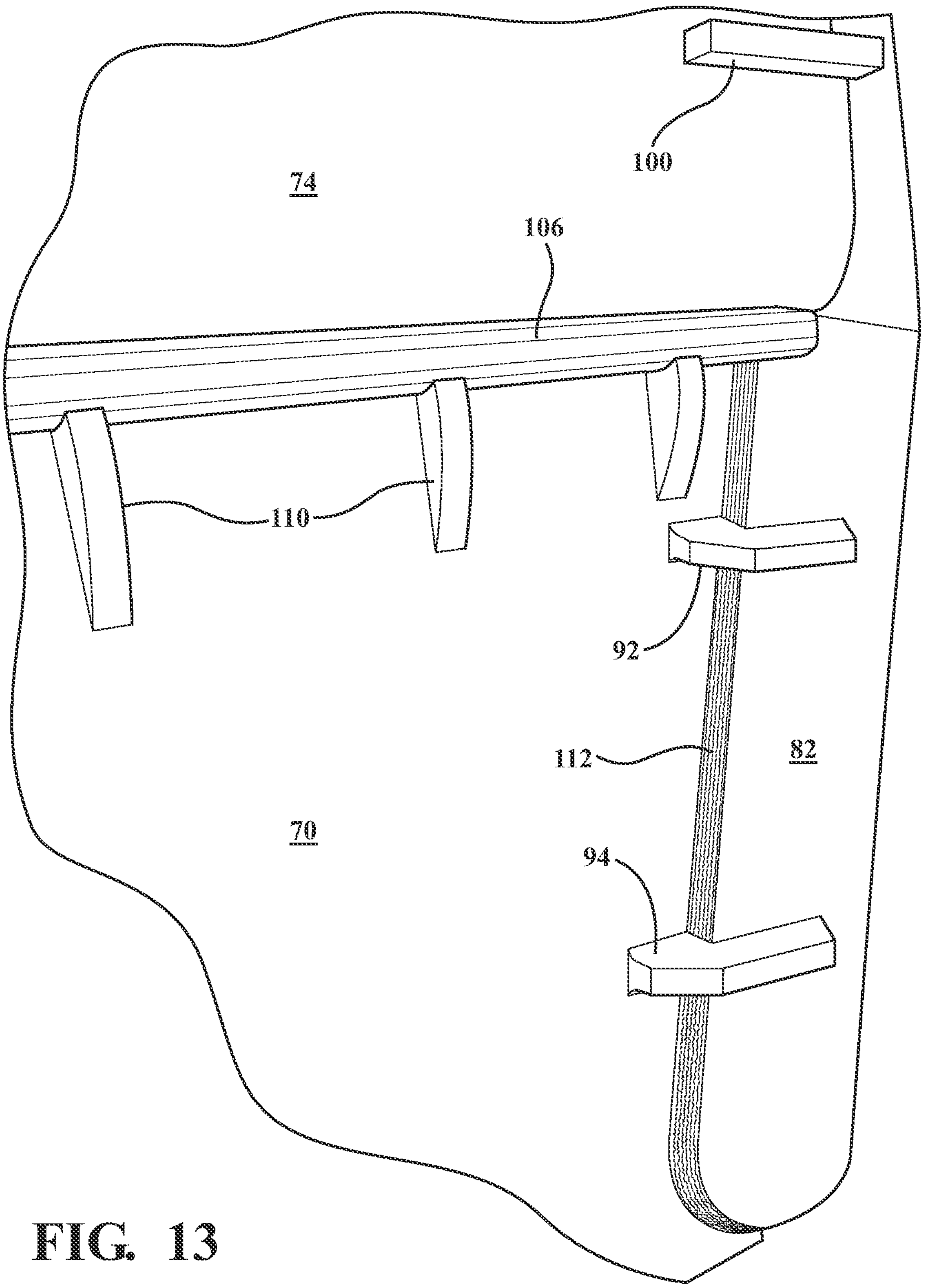
FIG. 13 is partial view taken of area 13 in FIG. 2 and better showing the weld patterns for securing the weld rivets in reinforcing fashion between the overlapping portions of the sides and bottom of each bucket half.
Figure 14:
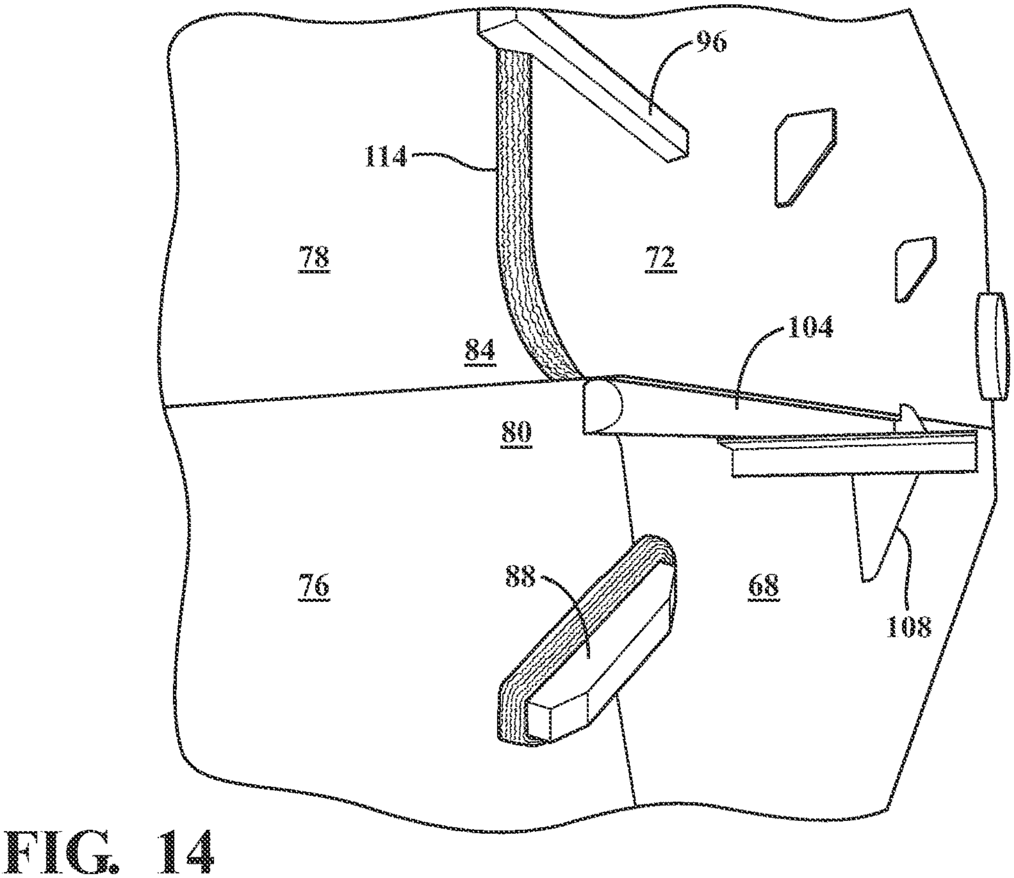
FIG. 14 is a rotated bottom side looking view and depicting the alternate weld directions employed for securing the overlapping portions of the sides and bottom of each bucket half.

As shown in FIG. 13, a partial view is taken of area 13 in FIG. 2 and better showing the weld patterns 112 for securing selected illustrated elongated weld rivets 92 and 94 in reinforcing fashion between the overlapping portions of the sides and bottom of each bucket half (further depicted by selected side plate 70 and opposing curved edge 82 of bottom 76). FIG. 14 is a rotated bottom side looking view and depicting the alternate weld directions (see downwardly facing at 114) employed for securing the overlapping portions of the opposite sides (see at 72) and bottom (at 78 with curved end 84) of each bucket half.

Figure 15:
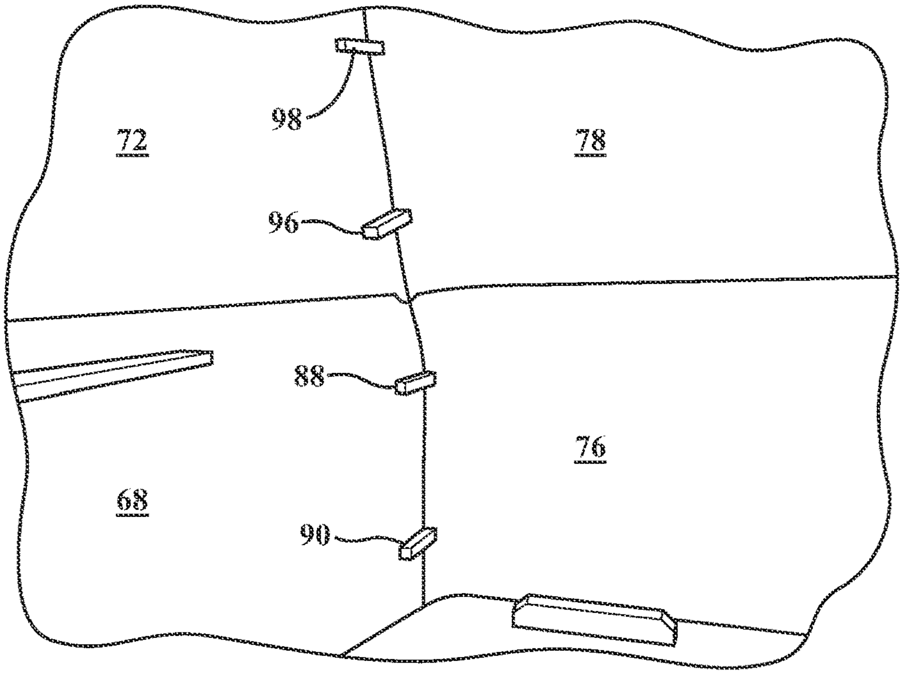
FIG. 15 is an interior looking view of the closed bucket and depicting the side to bottom reinforcing weld rivets which are greater in thickness than the overlapping steel layers.

FIG. 15 is an interior looking view of the closed bucket and depicting the side to bottom reinforcing weld rivets, which are greater than the thickness of the overlapping side and bottom steel layers. In this fashion, the combination of the elongated weld rivets secured to both of the interior and exterior facing locations defining the overlap between the curved ends 80/82 and 84/86 of the bottom plates 76 and 78 and the opposing side plates 68/70 and 72/74. By virtue of this construction, the reinforced engagement provided by the inner/outer edge defined weld rivets reduces instances of fracture of the welds between the sides and bottom members of the bucket halves.

Referencing again FIG. 1, a pair of rotary support bearings are provided, at 116 and 118, which seat through apertures (see as defined by inner circular perimeters 120 and 122) defined in uppermost locations of the selected side plates 72/74 of the second bucket half 14. Additional support brackets 124/126 are depicted which secured against the side plates 72/74, with inner ends of the bearings 116/118 securing, via circular bolt engagement arrays 128/130, to opposing inner overlapping side plates 68/70 of the first bucket half 12.

FIG. 2 is a succeeding assembled perspective of FIG. 1 and illustrating the features of the side weld bars (again shown at 106) located along the overlapping bucket edges to prevent seepage of the dredged sediment, combined with the welded rivets (of which are visible rivets at 92/94 and 100/102) extending the thickness between the side and end connected steel portions of each bucket half. As further shown, the sides 68/72 and 70/74 extend a distance above the upper frames 16/18 of the bucket halves 12/14. Additional reinforcement flanges (at 132/134 and 136/138) secure the inside surfaces of the upwardly projecting portions of the sides to the outer edges of the upper frames 16/18 in order to provide additional structural rigidity to the assembly.

Figure 3:
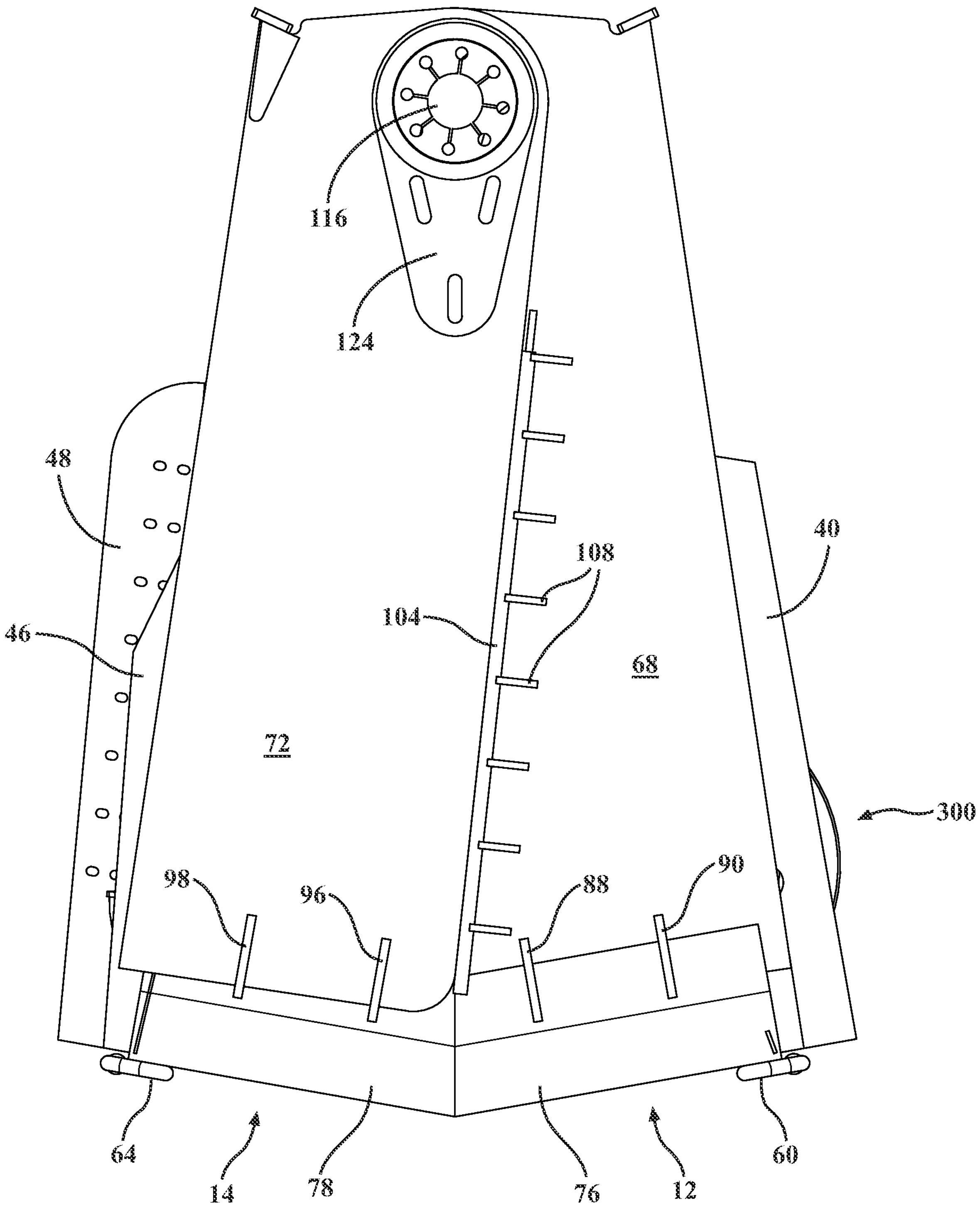
FIG. 3 is a closed side view of the clamshell bucket shown in FIG. 2.
Figure 5:
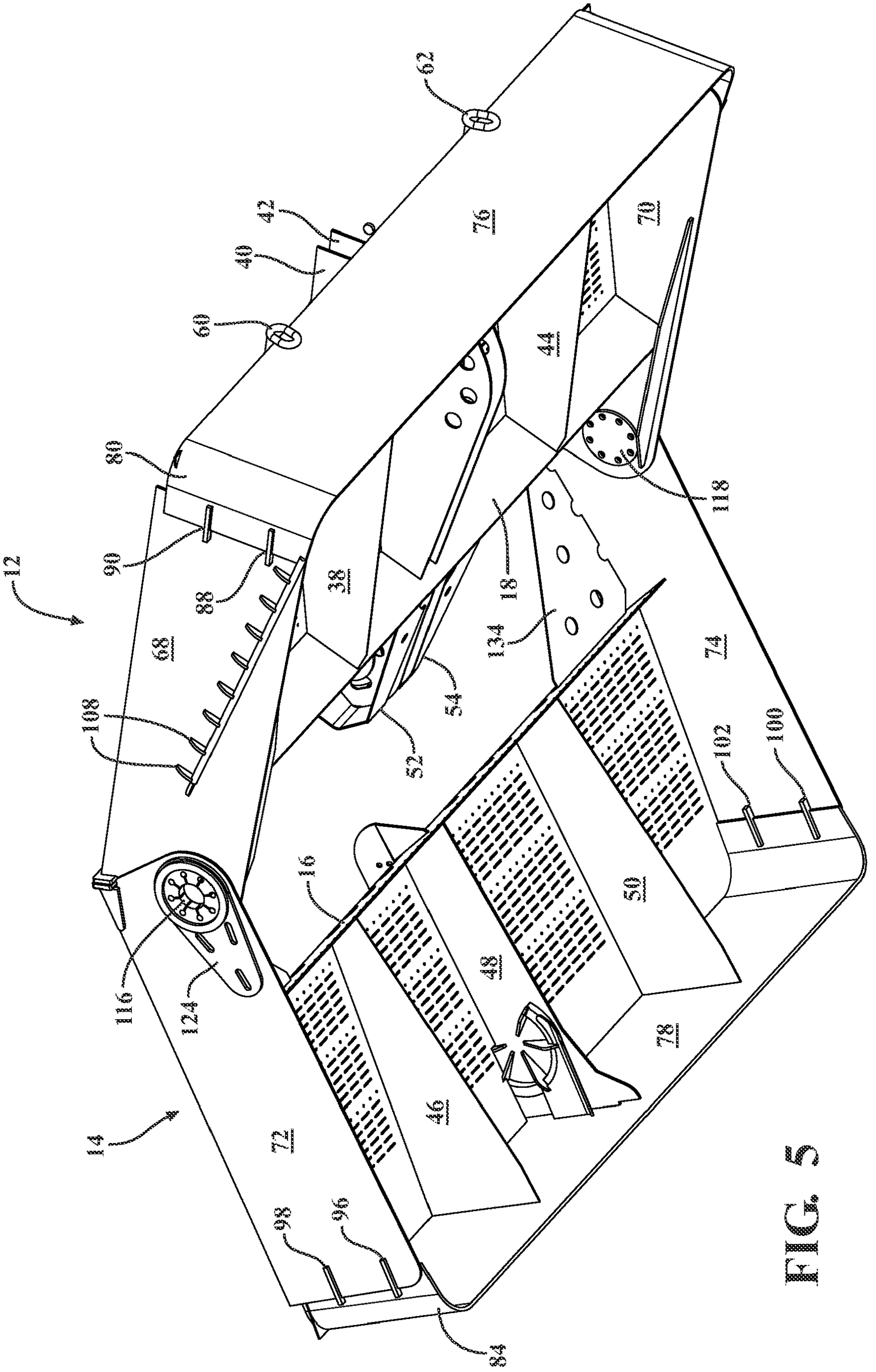
FIG. 5 is an underside looking perspective of the open bucket in FIG. 4.
Figure 6:
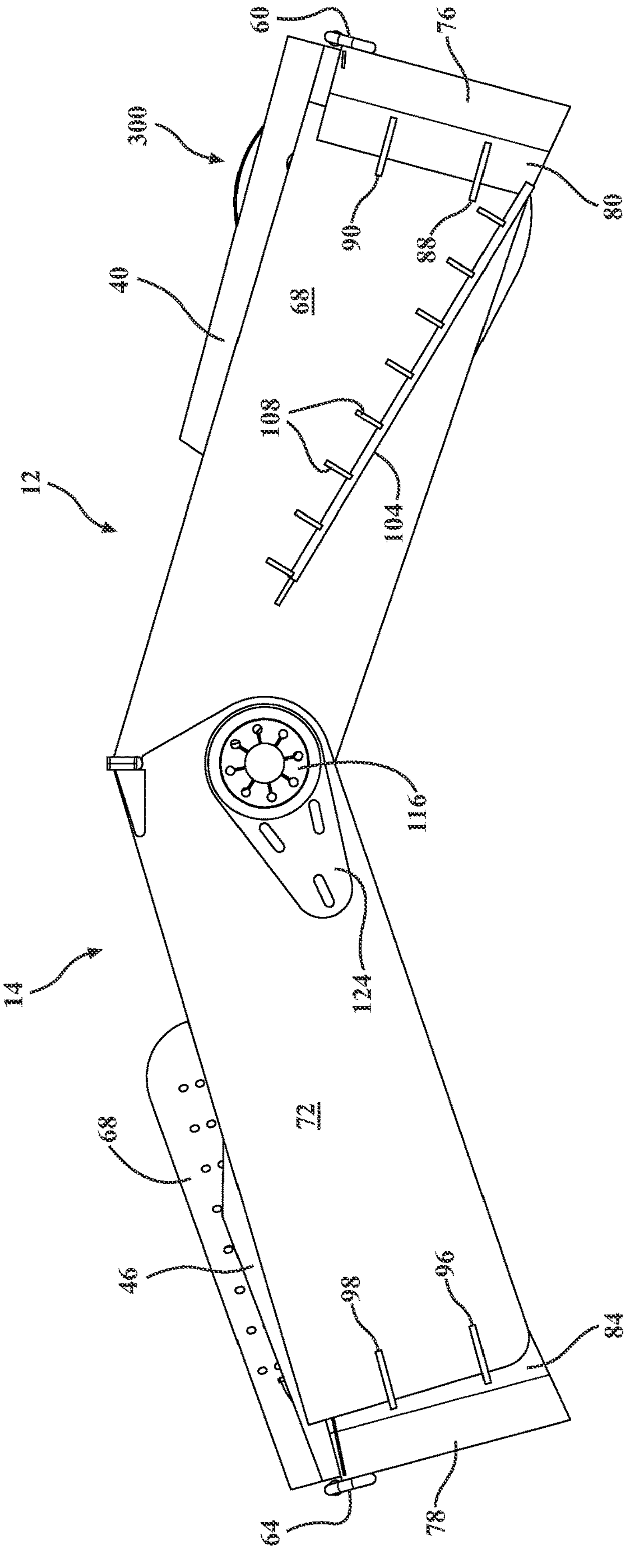
FIG. 6 presents a side plan view of the open bucket in FIG. 4.

FIG. 3 presents a closed side view of the clamshell bucket shown in FIG. 2, with FIG. 4 providing an illustration of the bucket in FIG. 2 in an open pivoted configuration and FIG. 5 an underside looking perspective of the open bucket in FIG. 4. Additional views include FIG. 6, which presents a side plan view of the open bucket in FIG. 4.

Figure 7A:
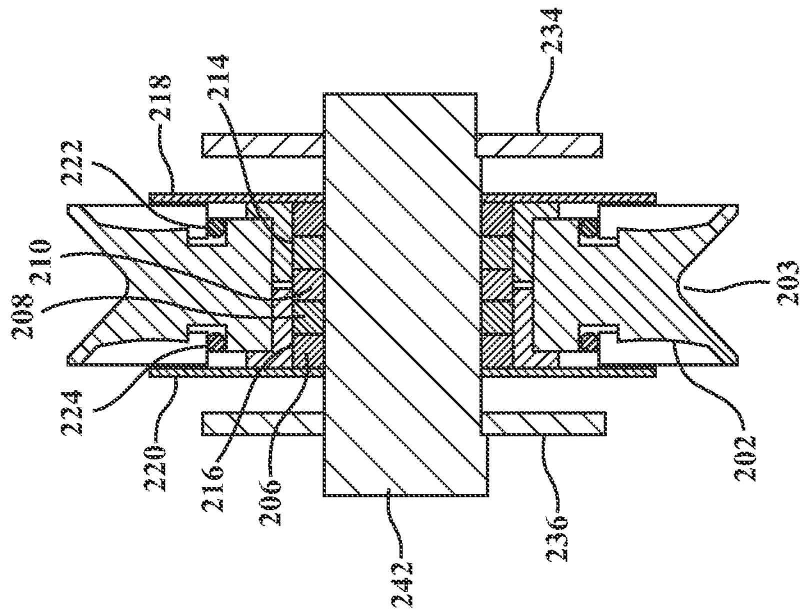
FIG. 7A is a cutaway view taken along line 7A-7A of FIG. 7 and depicting the upper sheave assembly with interference fit in order to provide improved durability and reduced wear.
Figure 7:
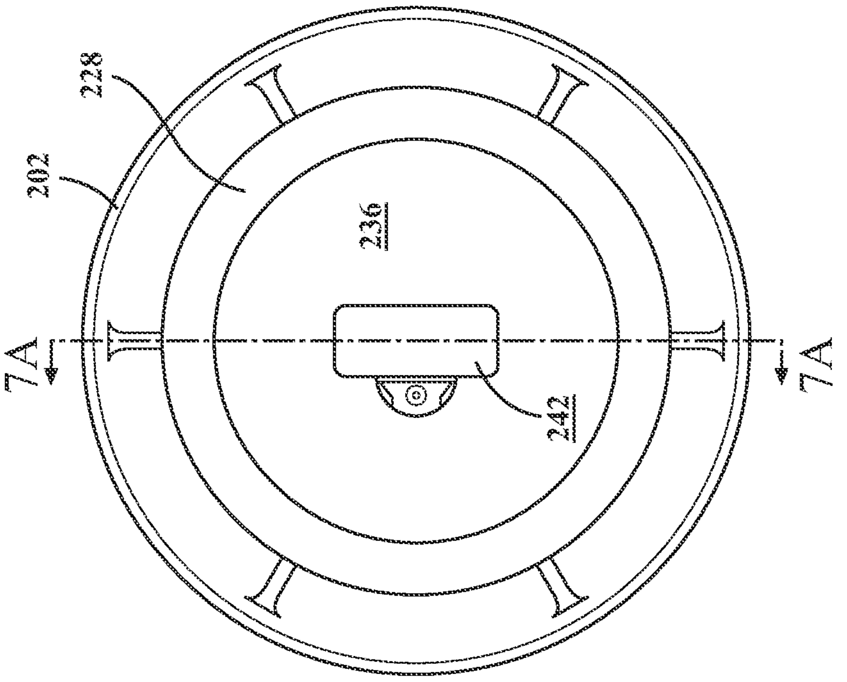
FIG. 7 presents a plan view of the upper sheave assembly.
Figure 8:
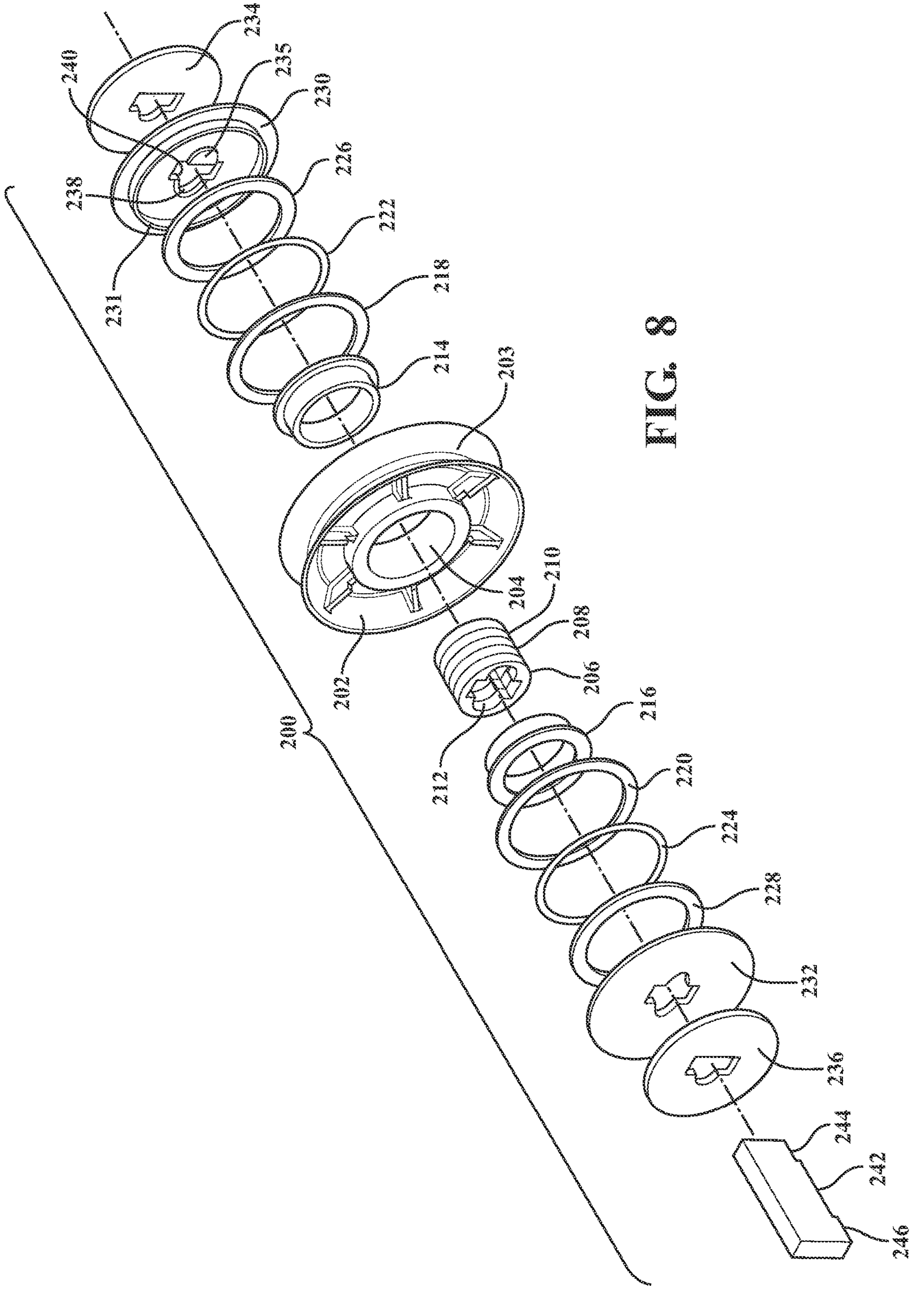
FIG. 8 is an exploded view of the upper sheave assembly.

FIG. 7 provides a plan view of the upper sheave assembly mounted between journaled locations (not shown) of the flange supports depicted at 52 and 54. FIG. 7A further presents a cutaway view taken along line 7A-7A of FIG. 7 and depicting the upper sheave assembly 200 with interference fit in order to provide improved durability and reduced wear. FIG. 8 presents an exploded view of the upper sheave assembly 200, with FIG. 9 providing a parts list of the upper sheave assembly in FIG. 8.

Referencing again FIGS. 7-9 collectively, the upper sheave assembly 200 includes a main upper sheave wheel 202 having an outer circumferential concave profile 203 for receiving the drive cable or conduit 2, along with a central inner rim 204 (see as best shown in FIG. 8) defining an aperture for receiving a plurality of pin receiving hub sandwiching or bearing plates (including first plate 206, second plate 208, center plate 210 et seq.), these further being arranged in a stacked fashion supported within the central rim 204 defining interior of the central hub plate 210. A grease stem 212 extends through the arrangement of hub plates 206-210. A pair of bronze bushings 214 and 216 secure against the wheel 202 for retaining the hub plate stack 206-210 within the inner rim of the main sheave wheel 202.

Identical arrangements of outer package components sandwich assemble on both sides of the central wheel 202, hub plates 206-210 and bushings 214/216, these providing the resistant fitting arrangement depicted in FIG. 7A with the central arrangement of plates. The outer identical sandwich components located on each of opposite sides of the central wheel 202 progressively include each of sheave hub backer plates 218 and 220, sealing rings 222 and 224, smaller ultra-high molecular weight (UHMW) elastomer rings 226 and 228, outer cover plates 230 and 232 with corresponding collars 231 and 233 (only collar 231 for cover plate 230 being shown in FIG. 8), along with back plates 235 (four total) mounting to the outer cover plates and, finally, outermost opposite end hub mounting blocks 234/236.

Each of the cover plates 230/232 and end mounting blocks 234/236 further include pseudo rectangular shaped central keyway apertures. This is representatively depicted by indexing horseshoe 238 and indexing profile 240 in selected plate 230. A rectangular cross sectional shaped and elongated hub pin 242 inserts widthwise through the sandwiched array of components 202-240. The hub pin 242 exhibits a pair of spaced apart stepped notches 244 and 246 which, upon being installed, define abutment stop locations with each of the end mounting blocks 234/236 in order to secure the hub pin in place.

Figure 10A:
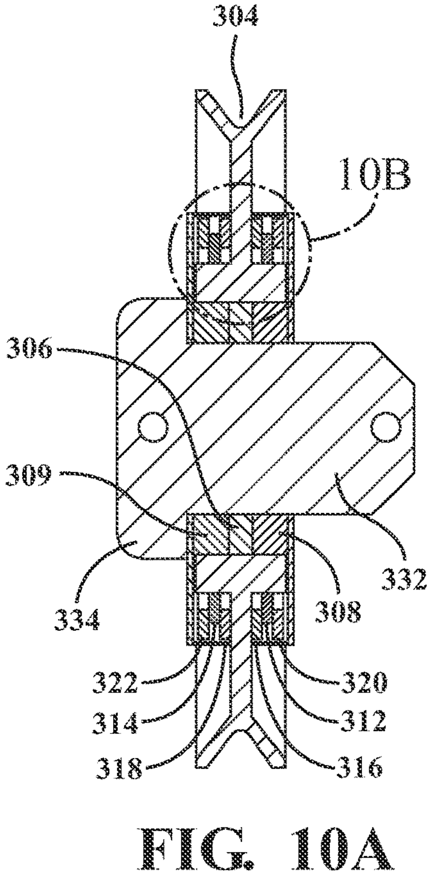
FIG. 10A is a cutaway view taken along line 10A-10A of FIG. 10 and depicting the lower sheave assembly for providing improved durability and reduced wear.
Figure 10B:
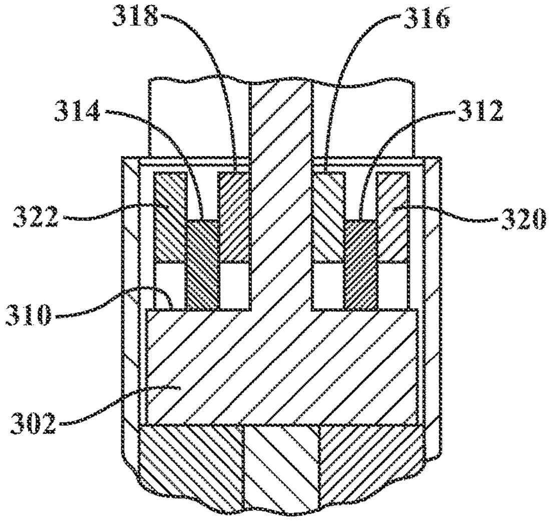
FIG. 10B presents an enlarged detail of area 10B of the lower sheave assembly shown in FIG. 10A.

Proceeding to FIG. 10, presented is a plan view of the lower sheave assembly 300 rotatably supported to the first bucket half 12 between the reinforcing brackets 40/42. FIG. 10A further provides a cutaway view taken along line 10A-10A of FIG. 10 and depicting the lower sheave assembly for providing improved durability and reduced wear, with FIG. 10B presenting an enlarged detail of area 10B of the lower sheave assembly shown in FIG. 10A. FIG. 11 further depicts an exploded view of the lower sheave assembly, with FIG. 12 providing a parts list of the lower sheave assembly in FIG. 11.

Referencing FIGS. 10-11 collectively, and as best shown, a main lower sheave wheel 302 exhibits an outer circumferential concave cross sectional recess 304. A single inner plate 306 and pair of outer hub plates 308 and 309 are provided in a stacked array (similar to those correspondingly described at 206-210 in FIG. 8 for the upper sheave 200) and which install within an inner circumferential surface 310 of the main sheave wheel 302. An identical sandwiching arrangement of plastic ring supports are provided on either side of the lower sheave assembly and include a center ring (at 312 and 314) and inner (316/318) and outer (320/322) rings.

A pair of outer sandwiching cover plates are shown at 324 and 326, each including an outer rim and inner opposing collar, respectively at 325 and 327. A rectangular keyway shaped aperture with keyway component is configured in aligning locations of each of the collars 324/326 and hub plates 306/308 (see at 329 in selected cover plate 324) and, as representatively depicted with reference to selected collar 324, includes anti-rotation studs 328 and anti-rotation tab end plates 330. An outer pin plate 332 inserts through the aligning keyway apertures of the outer plates 324/326 and inner stack supported hub plates 306, 308, 39. The outer pin plate 332 includes an inner pin plate 334 for securing the lower sheave assembly 300 between the support brackets 40/42 of the first bucket half 12.

The construction of both the upper 200 and lower 300 sheaves include the irregular cross sectional shaped pins (at 242 for the upper sheave and at 332 for the lower sheave) which slave the stacked arrangement of the inner hub supported plates (at 206/208/210 in FIG. 8 for the upper sheave 200 and further at 306/308 for hub plates in FIG. 11 for the lower sheave 300), with the outer cover plates (at 230/232 for upper sheave 200 and further at 324/326 for lower sheave 300). In this fashion, the intermediate sandwiched arrangement of sealing rings (again at 218/222/226 and 220/224/228 in FIG. 8 for lower sheave 200 and further at 316/312/320 and 318/314/322 in FIG. 11 for upper sheave 300) provide in combination a low friction supporting non-interference fit for each of the sheave assemblies and which, in operation, provides extended durability and useful life over an increased number of pivotal open/close cycles of the bucket assembly.

Referring now to FIG. 16, an illustration similar to FIG. 4 is generally shown at 400 of an improved level cut clamshell bucket according to a further embodiment of the present invention. As previously described, improved upper 500 and lower 600 sheave assemblies provide increased durability and wear resistance during repetitive opening and closing of the mechanical bucket halves. This again includes constructing the pivotally central pin supporting hub collar from a plurality of progressively inwardly stepped and stacked disc shaped plates, these being initially sectioned from a typically once inch sheet of hardened steel and welded to form the support collar hub located at a highest zone or area of stress exerted upon the sheave assembly.

Figure 17:
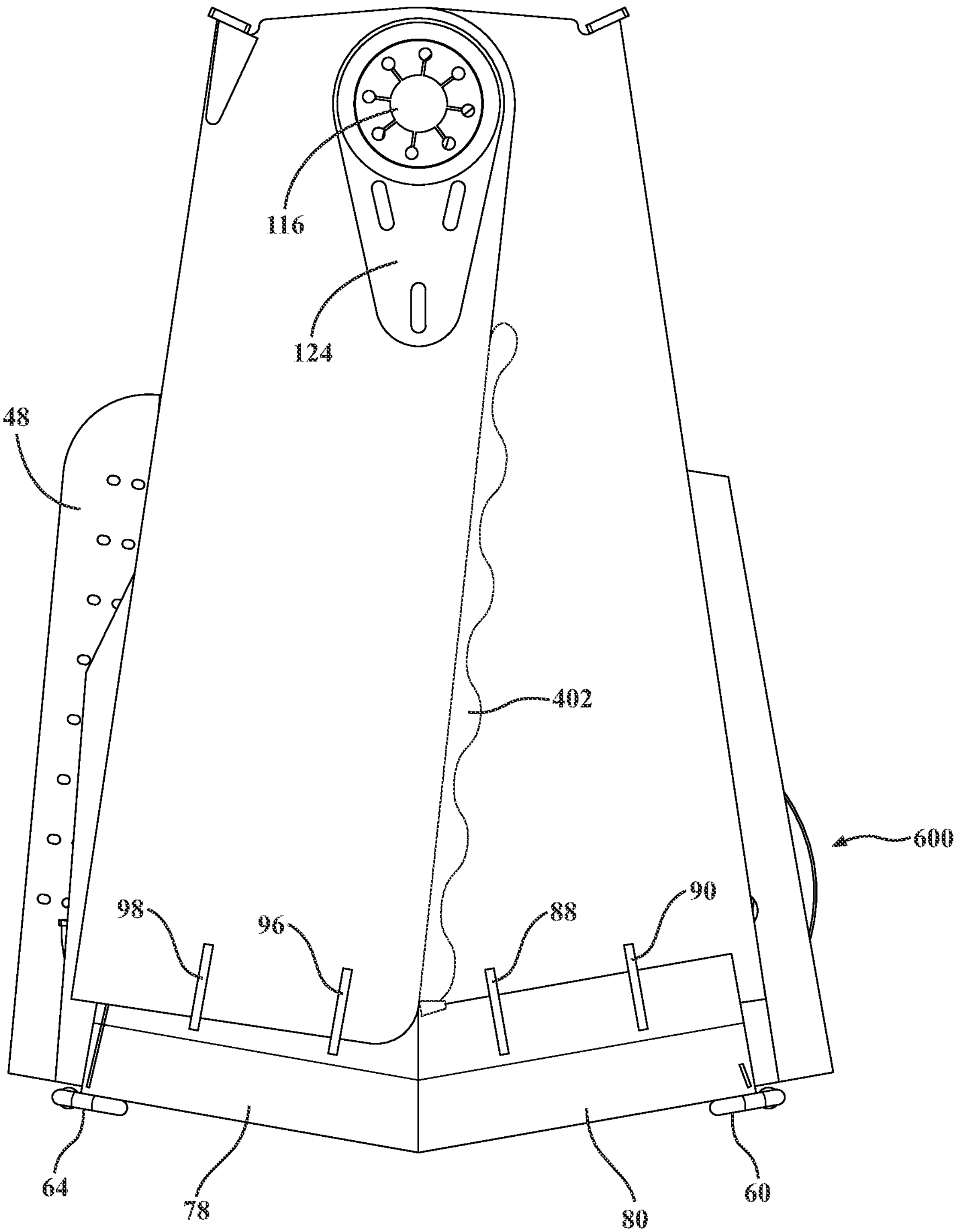
FIG. 17 is a closed side view of the clamshell bucket shown in FIG. 16.

Referencing again the overall open and side plan closed views of the bucket in FIGS. 16-17, similar features to the level cut clamshell bucket 10 of the first embodiment are repetitively numbered, with the additional features associated with the new embodiment including redesigned side weld bars, see at 402 in FIGS. 16-17 and further at 404 in FIG. 19 arranged on the opposite end of overlapping bucket side edges (compared to as previously shown at 106) to prevent seepage of the dredged sediment.

Proceeding to FIG. 18, a sectional view of central pin supporting hub collar formed from a plurality of progressively inwardly stepped and disc shaped plates, these shown at 406, 408, 410 et. seq., and being initially sectioned from a typically once inch sheet of hardened steel and welded to form the support collar hub at the highest zone or area of stress exerted upon either of the upper 500 or lower 600 sheave subassemblies. In one non-limiting variant, any number of the individually stepped and overlapping plates 406, 408, 410 can be utilized and usually include up to several plates which are originally sectioned from a one inch thick sheet of pre-hardened steel.

Typically, first and second stepped sub-pluralities of the plates are welded on opposite facing sides of a main hub (see at 418 in FIG. 21 et seq. and also commonly referenced as a central wheel component) having an annular interior which aligns with a common inner annular diameter of the main hub (this further shown at 419 in FIG. 18). As further best shown in FIG. 21, the opposite annular stepped pluralities of stacked plates, represented by 406/408/410 and 406'/408'/410', are shown welded in their partially overlapping fashion to the central or main hub 418 and so that these collectively define a reinforced hub connection, along with the hub bearing plates and installed pin (see as described in FIG. 20 et. seq., at a location of maximum stress on the sheave assembly (500 or 600) during normal operation.

Figure 21:
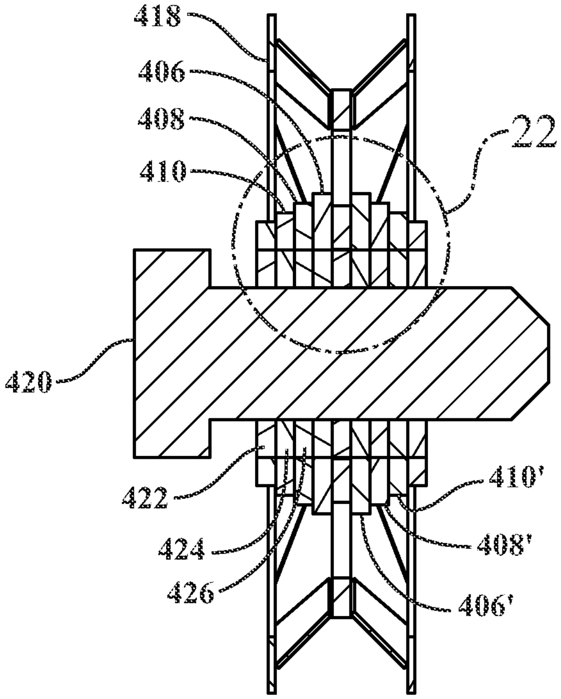
FIG. 21 is rotated cutaway view taken along line 21-21 of FIG. 20 and showing a first example of the sheave subassembly with mounting plates, pin and stacked disc shaped plates.

Any of plasma, torch, or water jet injection with carbon grit operations can be utilized for individually sectioning the plates 406, 408, 410 so that they incrementally vary in outer diameter (as shown), while possessing a common inner diameter (see further at 412, 414, 416, et seq.), this in order to create a smooth interior hub profile in order to seat the pin and stacked disc shaped plates (see FIG. 21 et. seq.). The stepped plates 406, 408, 410, et seq. are welded together about their stacked annular interfaces in a manner, as will be further described, replaces standard tubing for the sheave collar (such as depicted for upper 200 and lower 300 sheave assemblies in the first embodiment) and which provides for strengthening of the sheave assemblies 500 and 600 at a maximum tensile stress location).

FIG. 19 is an illustration of an alternate configuration of the side weld bars (such as exemplarily shown at 404) which are again located along selected overlapping bucket edges (see at 70 and 74 in comparison to as shown at 402 in FIG. 16), this again in order to prevent seepage of the dredged sediment according to the embodiment of FIG. 16. Beyond that shown, it is understood that the weld bars 402/404 (or those previously shown at 104/106) can be modified without limitation in order to provide adequate seepage prevention during any type of dredging operation.

Figure 20:
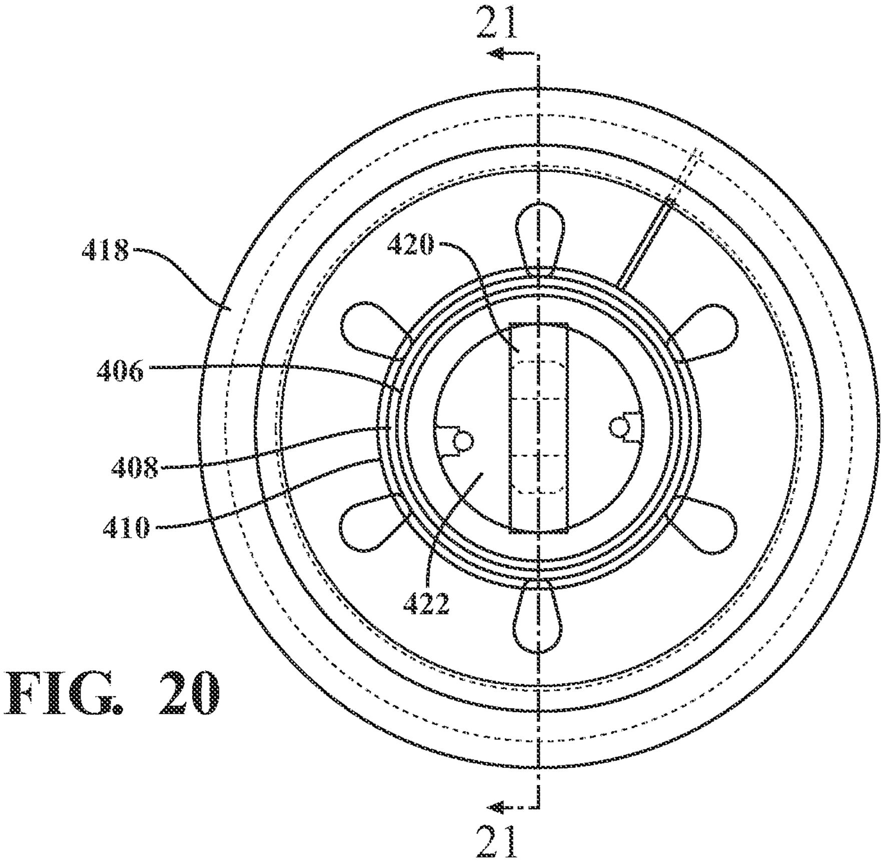
FIG. 20 is a plan view of a central pin supporting hub collar incorporated into either of upper and lower sheave subassemblies of the level cut bucket.

Proceeding to FIG. 20, a plan view is shown of the central pin supporting main or central hub collar 418, which again can be incorporated into either of the upper 500 and/or lower 600 sheave subassemblies of the level cut bucket 400. FIG. 21 is rotated cutaway view taken along line 21-21 of FIG. 20 and showing a first example of either of the upper or lower sheave subassemblies, again including the main hub 410 with opposite stacked array of stepped and welded mounting plates 406/408/410 and 406'/408'/410' (it again being understood that any plurality of up to several such plates can be welded in the illustrated stacked fashion on either side of the main hub 418). A mounting pin 420 secures the given sheave assembly 500/600 to the bucket 12 (see again FIG. 16). A plurality of inner stacked hub bearing pieces (see further at 422, 424, 426, et seq.), are contained within the inner annular diameter of the aligning main hub and stacked and welded plates, these further collectively defining a common keyed recess 428 for receiving and mating with the inserted pin 420.

Figure 22:
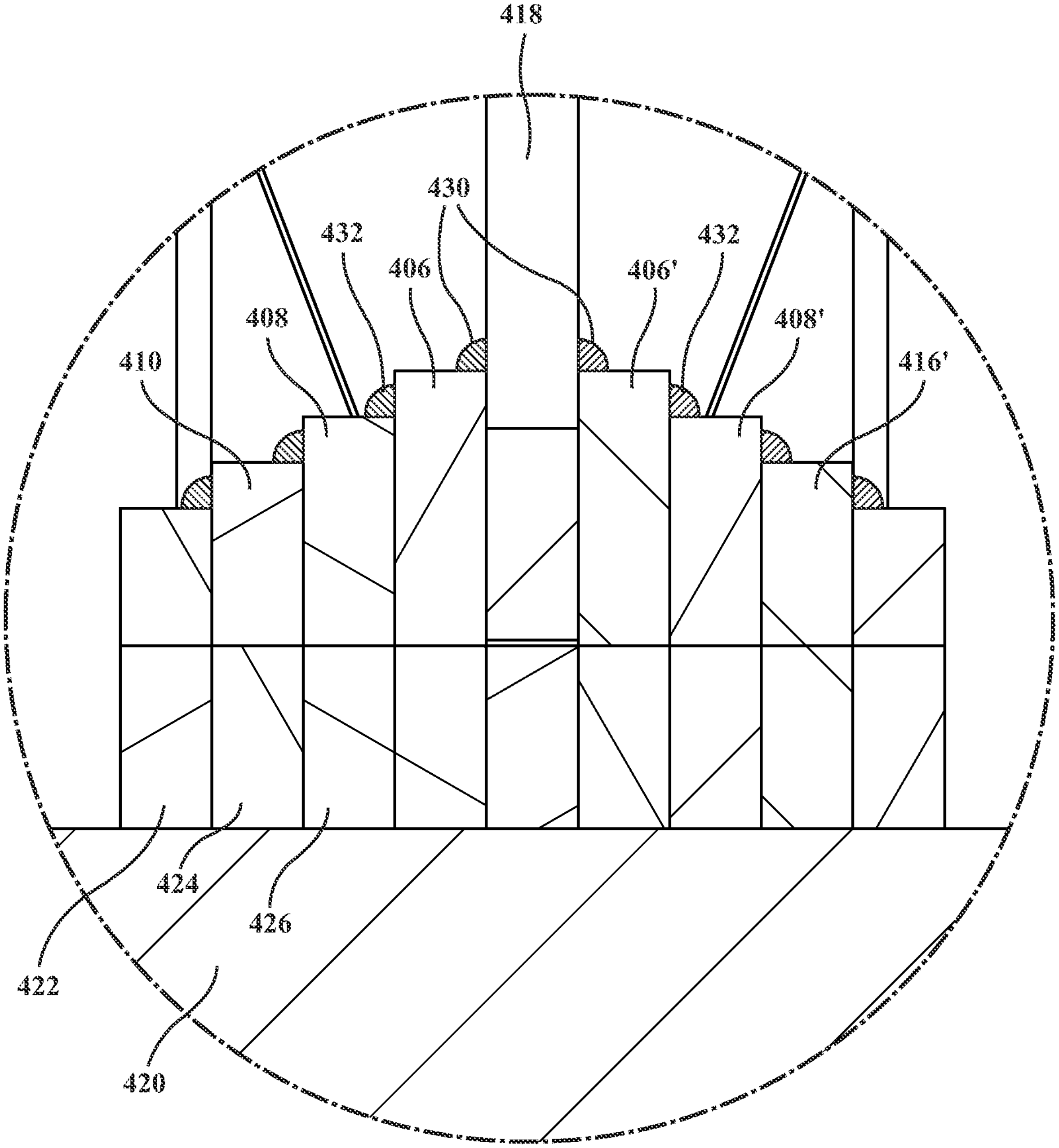
FIG. 22 is an enlarged partial view of area 22 taken from FIG. 21 and better showing the stepped welded configuration defining the hub collar disc plates.

FIG. 22 is an enlarged partial view of area 22 taken from FIG. 21 and better showing the stepped welded configuration defining the opposite sub-pluralities of annular stepped hub collar disc plates (this depicting a non-limiting arrangement of four such annularly stacked and welded plates on either side of the main hub 418 and again commonly referenced at 406/408/410 and 406'/408'/410'). FIG. 22 also best shows the welds which are provided at each stepped annular interface between the stacked plates (i.e. welds 430 for securing the first and largest outer diameter of the plates 406/406' to the opposing edges of the main hub 418, with additional welds 432, et seq. for securing the second stepped plates 408/408' respectively to the first plates 406/406'.

Figure 23:
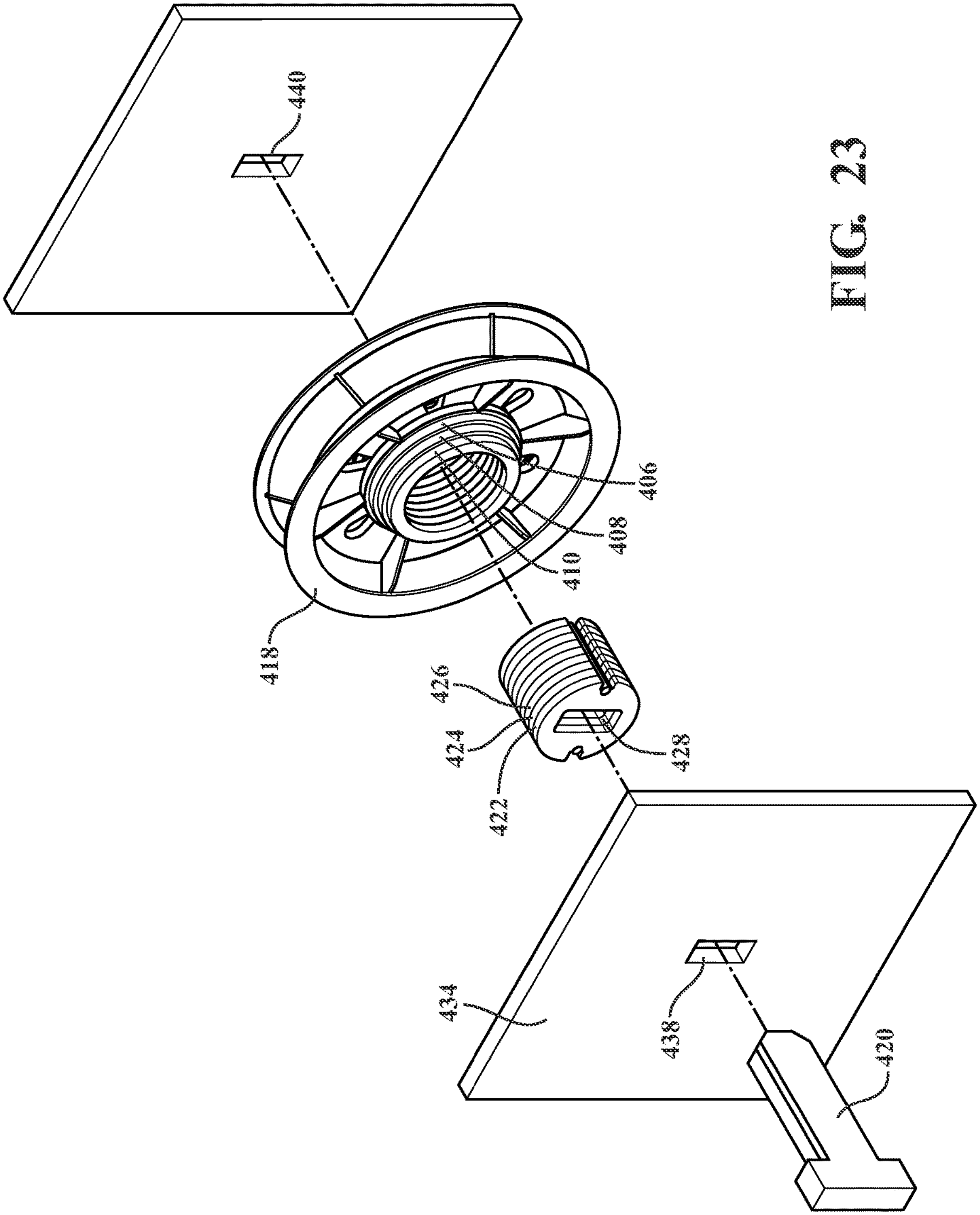
FIG. 23 is an exploded view of the central pin supporting hub collar of FIGS. 20-21 and depicting the central hub with welded stacked disc shaped plates, pin hub bearing plates, outer mounting plates and rectangular pin.

FIG. 23 is an exploded view of the central pin supporting hub collar of FIGS. 20-21 and again depicting the central hub 418 with welded stacked disc shaped plates 406/408/410, pin hub bearing plates 422, 424, 426 et seq., along with a pair of outer mounting plates 434 and 436, these respectively having aligning keyed locations 438 and 440 for receiving the rectangular cross sectional pin 420.

Figure 24:
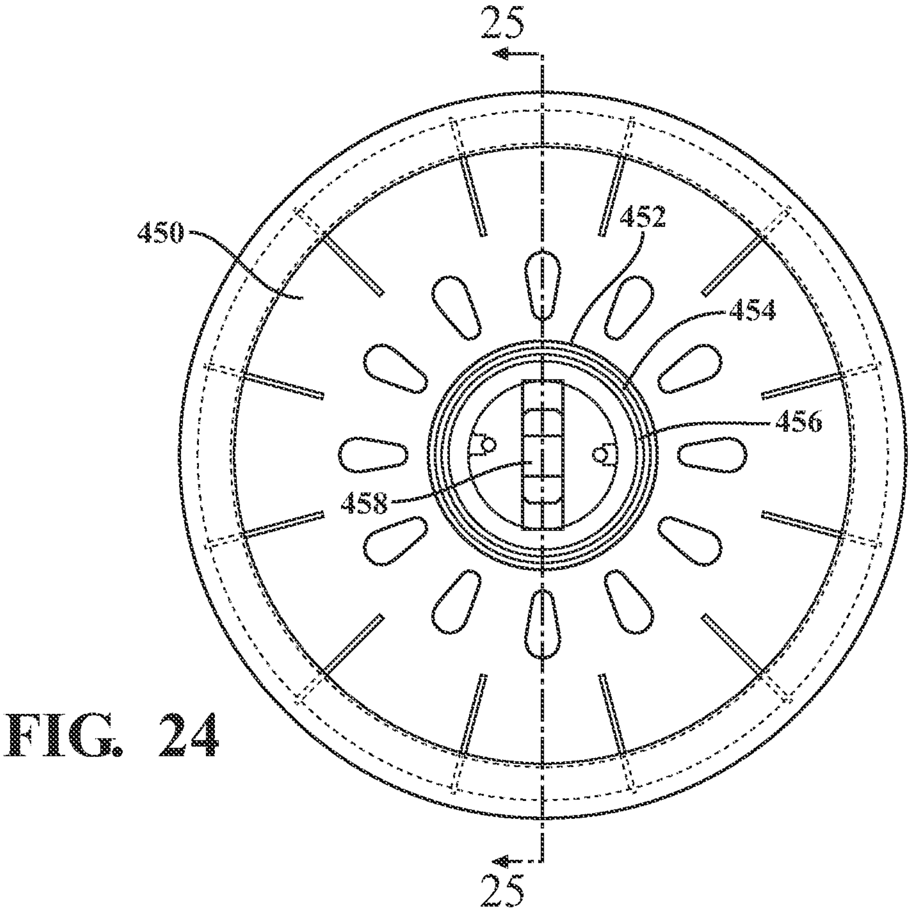
FIG. 24 is a plan view of a central pin supporting hub collar similar to FIG. 20 and according to a further variant which is incorporated into either of upper and lower sheave subassemblies of the level cut bucket.

Proceeding to FIG. 24, a plan view is shown of a central pin supporting hub collar 450, similar to as shown in FIG. 20 and according to a further variant which is again incorporated into either or both of the upper 500 and/or lower 600 sheave subassemblies of the level cut bucket. As further shown in succeeding FIGS. 25-26, this includes a similar arrangement of annularly stacked and welded mounting plates 452/454/456 and 452'/454'/456' arranged on opposite facing sides of the main hub 450, along with a pin 458 for inserting though a common keyed recess, shown at 460 in FIG. 26 associated with a stack of inner hub bearing plates 462, 464, 466 et seq., and stacked disc shaped plates.

Figure 25:
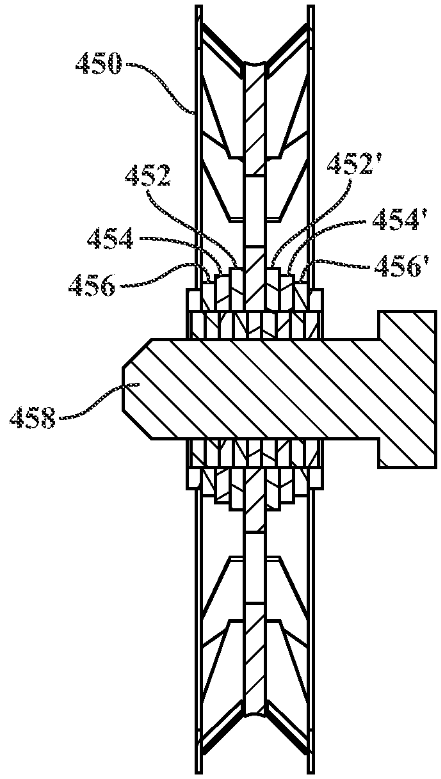
FIG. 25 is rotated cutaway view taken along line 25-25 of FIG. 24 and showing the further example of the sheave subassembly with mounting plates, pin and stacked disc shaped plates.
Figure 26:
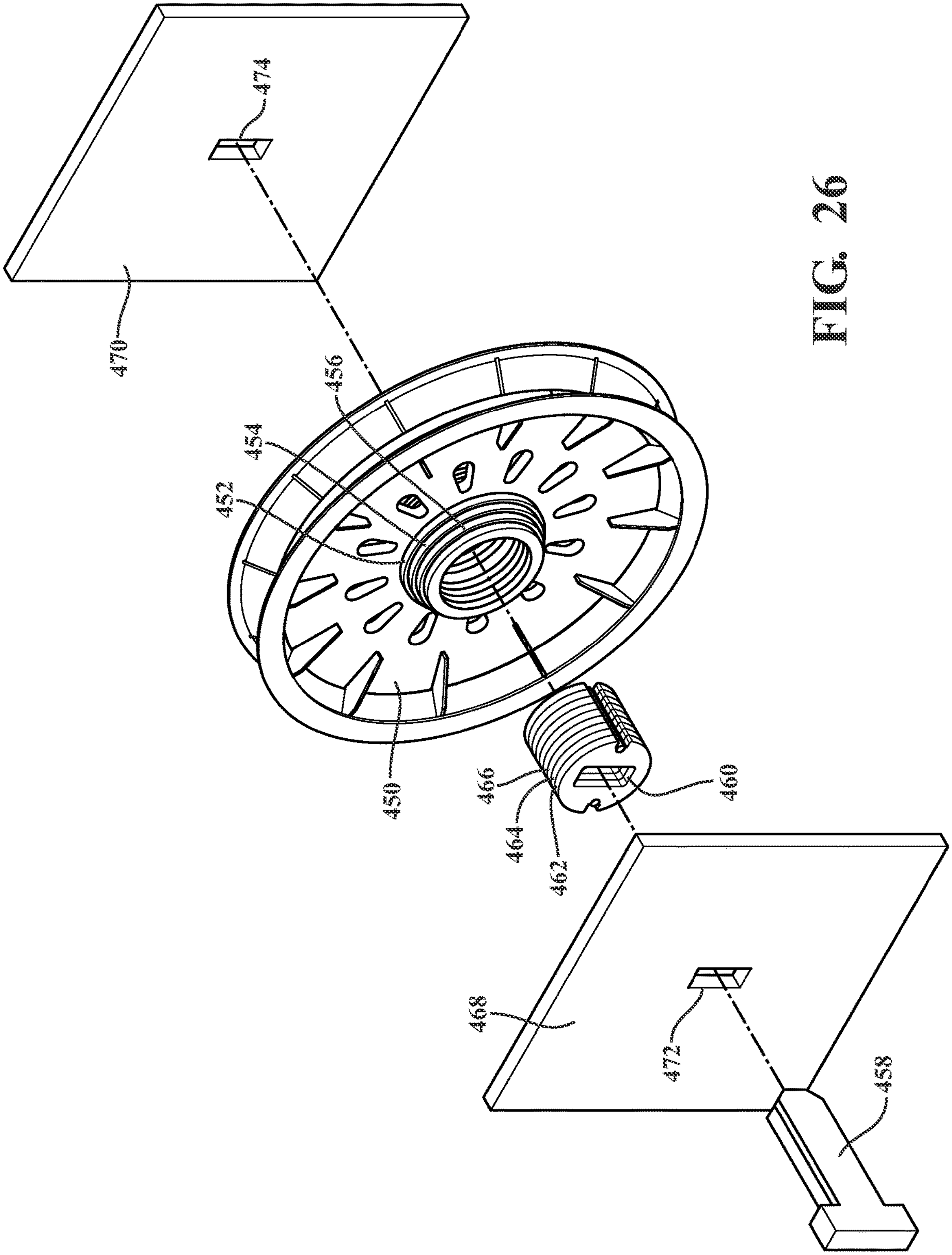
FIG. 26 is an exploded view of the central pin supporting hub collar of FIGS. 24-25 and depicting the central hub with welded stacked disc shaped plates, pin hub bearing plates, outer mounting plates and rectangular pin according to the further variant.

FIG. 26 again provides an exploded view of the central pin supporting hub collar of FIGS. 24-25 and depicting the central hub 450 with welded stacked disc shaped plates (again shown at 452, 454, 456 et seq.), pin hub bearing plates 462, 464, 466, et seq., along with a pair of outer mounting plates 468 and 470, these respectively likewise having aligning keyed locations 472 and 474 for receiving the rectangular cross sectional pin 458.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as “including”, “comprising”, “incorporating”, “consisting of”, “have”, “is” used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, “first”, “second”, “third”, “primary”, “secondary”, “main” or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. A clamshell bucket assembly, comprising:

first and second pivotally connected bucket halves, each including a length extending upper frame and a length extending bottom plate, between which are secured a plurality of panels between first and second opposing ends;

an upper sheave assembly and a lower sheave assembly secured to said first bucket half, a cable pulley extending successively through defined pulley supports for receiving a displaceable line associated with a supporting crane, and which extends successively through an upper positioned bridle or guide component to each of said upper sheave assembly, said lower sheave assembly and terminating at a fixed end point configured with said second bucket half;

each of said upper and lower sheave assemblies further comprising a central wheel component having an inner perimeter defining aperture receiving a plurality of hub bearing plates, outer ring bearings and outermost sandwiching cover plates;

said bucket halves further defining pairs of inner and outer overlapping sides which rotate between an open position and a closed position in which said sides partially overlap to define a scoop for permitting outflow of water when elevated above a surface level, while retaining a volume of a dredged sediment material; and a pair of sediment retention bars secured between said overlapping sides to prevent outflow of sediment contained in the scoop of the bucket in the closed position.

2. The bucket assembly according to claim 1, further comprising said retention bars each securing to outer facing surfaces of said inner sides corresponding to said first bucket half, said bars abutting against said outer overlapping sides corresponding to said second bucket half in the closed position.

3. The bucket assembly according to claim 1, further comprising support ribs extending from said sediment retention bars and welded directly to said inner sides of said first bucket half.

4. The bucket assembly according to claim 1, each of said bucket halves further comprising spaced apart and elongated bar shaped weld rivets for reinforcing a welded connection established between said sides and said bottom plate of said bucket halves.

5. The bucket assembly according to claim 4, further comprising said weld rivets extending beyond an overlapping thickness between curved ends of said bottom plates and said sides of each bucket half.

6. The bucket assembly according to claim 1, further comprising a rectangular cross sectional shaped hub pin extending through mating keyway apertures defined in said stacked central plates, and outermost cover plates.

7. The bucket assembly according to claim 1, each of said upper and lower sheave assemblies further comprising a central pin supporting hub collar formed from a plurality of progressively stepped and stacked disc shaped plates welded together to a central wheel component at a highest zone or area of stress exerted during operation of the bucket.

8. The bucket assembly according to claim 7, further comprising said disc shaped plates being sectioned from a hardened steel sheet prior to stacking and welding to the central wheel component.

9. A clamshell bucket assembly, comprising:

first and second pivotally connected bucket halves, each including a length extending upper frame and a length extending bottom plate, between which are secured a plurality of panels between first and second opposing ends further defining pairs of inner and outer overlapping sides which rotate between an open position and a closed position, in which said inner and outer overlapping sides partially overlap to define a scoop for permitting outflow of water when elevated above a surface level while retaining a volume of a dredged sediment material;

a pair of sediment retention bars secured to outer facing surfaces of said inner sides corresponding to said first bucket half, said bars abutting against said outer overlapping sides corresponding to said second bucket half in the closed position in order to prevent outflow of sediment contained in the scoop of the bucket;

an upper sheave assembly and a lower sheave assembly secured to said first bucket half, a cable pulley extending successively through defined pulley supports for receiving a displaceable line associated with a supporting crane, and which extends successively through an upper positioned bridle or guide component to each of said upper sheave assembly, said lower sheave assembly and terminating at a fixed end point configured with said second bucket half;

each of said upper and lower sheave assemblies further including a central wheel component defining a central pin supporting hub collar formed from a plurality of progressively stepped and stacked disc shaped plates welded together to a central wheel component at a highest zone or area of stress exerted during operation of the bucket, said disc shaped plates being sectioned from a hardened steel sheet prior to stacking and welding to the central wheel component; and spaced apart and elongated bar shaped weld rivets for reinforcing a welded connection established between said sides and said bottom plate of said bucket halves.

10. The bucket assembly according to claim 9, further comprising said weld rivets extending beyond an overlapping thickness between curved ends of said bottom plates and said sides of each bucket half.

11. The bucket assembly according to claim 9, further comprising support ribs extending from said sediment retention bars and welded directly to said inner sides of said first bucket half.

12. The bucket assembly according to claim 9, further comprising a rectangular cross sectional shaped hub pin extending through mating keyway apertures defined in said stacked central plates, and outermost cover plates.

13. A clamshell bucket assembly, comprising:

first and second pivotally connected bucket halves, each including a length extending upper frame and a length extending bottom plate, between which are secured a plurality of panels between first and second opposing ends, further defining pairs of inner and outer overlapping sides which rotate between an open position and a closed position, in which said inner and outer overlapping sides partially overlap to define a scoop for permitting outflow of water when elevated above a surface level while retaining a volume of a dredged sediment material;

an upper sheave assembly and a lower sheave assembly secured to said first bucket half, a cable pulley extending successively through defined pulley supports for receiving a displaceable line associated with a supporting crane, and which extends successively through an upper positioned bridle or guide component to each of said upper sheave assembly, said lower sheave assembly and terminating at a fixed end point configured with said second bucket half;

each of said upper and lower sheave assemblies further including a central wheel component defining a central pin supporting hub collar formed from a plurality of progressively stepped and stacked disc shaped plates welded together to a central wheel component at a highest zone or area of stress exerted during operation of the bucket, said disc shaped plates being sectioned from a hardened steel sheet prior to stacking and welding to the central wheel component;

a pair of sediment retention bars secured to outer facing surfaces of said inner sides corresponding to said first bucket half, said bars abutting against said outer overlapping sides corresponding to said second bucket half in the closed position in order to prevent outflow of sediment contained in the scoop of the bucket; and spaced apart and elongated bar shaped weld rivets for reinforcing a welded connection established between said sides and said bottom plate of said bucket halves.

14. The bucket assembly according to claim 13, further comprising support ribs extending from said sediment retention bars and welded directly to said inner sides of said first bucket half.

15. The bucket assembly according to claim 13, further comprising said weld rivets extending beyond an overlapping thickness between curved ends of said bottom plate and said sides of each bucket half.

16. The bucket assembly according to claim 13, further comprising a rectangular cross sectional shaped hub pin extending through mating keyway apertures defined in said stacked central plates, and outermost cover plates.

17. A clamshell bucket assembly, comprising:

first and second pivotally connected bucket halves, each including a length extending upper frame and a length extending bottom plate, between which are secured a plurality of panels between first and second opposing ends;

an upper sheave assembly and a lower sheave assembly secured to said first bucket half, a cable pulley extending successively through defined pulley supports for receiving a displaceable line associated with a supporting crane, and which extends successively through an upper positioned bridle or guide component to each of said upper sheave assembly, said lower sheave assembly and terminating at a fixed end point configured with said second bucket half;

each of said upper and lower sheave assemblies further including a central pin supporting hub collar formed from a plurality of progressively stepped and stacked disc shaped plates welded together to a central wheel component at a highest zone or area of stress exerted during operation of the bucket;

said bucket halves further defining pairs of inner and outer overlapping sides which rotate between an open position and a closed position in which said sides partially overlap to define a scoop for permitting outflow of water when elevated above a surface level, while retaining a volume of a dredged sediment material; and a pair of sediment retention bars secured between said overlapping sides to prevent outflow of sediment contained in the scoop of the bucket in the closed position.

* * * * *